(12) United States Patent
Taeda et al.

(10) Patent No.: US 9,666,905 B2
(45) Date of Patent: May 30, 2017

(54) ELECTROLYTIC SOLUTION, ELECTROCHEMICAL DEVICE, LITHIUM ION SECONDARY BATTERY, AND MODULE

(71) Applicant: DAIKIN INDUSTRIES, LTD., Osaka-shi, Osaka (JP)

(72) Inventors: Mayuko Taeda, Settsu (JP); Meiten Koh, Settsu (JP); Aoi Nakazono, Settsu (JP); Michiru Kagawa, Settsu (JP); Yoshiko Kuwajima, Settsu (JP); Michiaki Okada, Settsu (JP); Tomoo Shimada, Settsu (JP); Shinichi Kinoshita, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 38 days.

(21) Appl. No.: 14/769,863

(22) PCT Filed: Feb. 27, 2014

(86) PCT No.: PCT/JP2014/054883
§ 371 (c)(1),
(2) Date: Aug. 24, 2015

(87) PCT Pub. No.: WO2014/136648
PCT Pub. Date: Sep. 12, 2014

(65) Prior Publication Data
US 2016/0006078 A1 Jan. 7, 2016

(30) Foreign Application Priority Data

Mar. 4, 2013 (JP) .................. 2013-042312
Mar. 4, 2013 (JP) .................. 2013-042315

(51) Int. Cl.
| | | |
|---|---|---|
| *H01M 10/0567* | (2010.01) | |
| *H01M 10/052* | (2010.01) | |
| *H01M 10/0568* | (2010.01) | |
| *H01M 10/0569* | (2010.01) | |
| *H01G 11/58* | (2013.01) | |
| *H01G 11/60* | (2013.01) | |
| *H01G 11/62* | (2013.01) | |
| *H01G 11/64* | (2013.01) | |

(52) U.S. Cl.
CPC ........ *H01M 10/0567* (2013.01); *H01G 11/58* (2013.01); *H01G 11/60* (2013.01); *H01G 11/62* (2013.01); *H01G 11/64* (2013.01); *H01M 10/052* (2013.01); *H01M 10/0568* (2013.01); *H01M 10/0569* (2013.01); *H01M 2300/0025* (2013.01); *Y02E 60/13* (2013.01)

(58) Field of Classification Search
CPC ......... H01M 10/0567; H01M 10/0569; H01M 10/0568; H01M 10/052; H01G 11/58; H01G 11/60; H01G 11/62; H01G 11/64; Y02E 60/13
See application file for complete search history.

(56) References Cited

FOREIGN PATENT DOCUMENTS

| | | |
|---|---|---|
| JP | 07-176322 A | 7/1995 |
| JP | 2002-302649 A | 10/2002 |
| JP | 2003-007336 A | 1/2003 |
| JP | 2005-259641 A | 9/2005 |
| JP | 2010-073367 A | 4/2010 |
| JP | 2012-134137 A | 7/2012 |
| WO | 2005/069423 A1 | 7/2005 |

OTHER PUBLICATIONS

International Preliminary Report on Patentability dated Sep. 8, 2015, issued by the International Bureau in corresponding International Application No. PCT/JP2014/054883.
International Search Report for PCT/JP2014/054883 dated May 20, 2014.

*Primary Examiner* — Laura Weiner
(74) *Attorney, Agent, or Firm* — Sughrue Mion, PLLC

(57) ABSTRACT

An electrolytic solution including a nonaqueous solvent (I), an electrolyte salt (II), and 0.001 to 20% by mass of a compound represented by the formula (1) or the formula (A) as defined herein.

7 Claims, No Drawings

ELECTROLYTIC SOLUTION, ELECTROCHEMICAL DEVICE, LITHIUM ION SECONDARY BATTERY, AND MODULE

CROSS REFERENCE TO RELATED APPLICATIONS

This application is a National Stage of International Application No. PCT/JP2014/054883 filed Feb. 27, 2014, claiming priority based on Japanese Patent Application No. 2013-042312 filed Mar. 4, 2013 and 2013-042315 filed Mar. 4, 2013, the contents of all of which are incorporated herein by reference in their entirety.

TECHNICAL FIELD

The present invention relates to electrolytic solutions, electrochemical devices, lithium ion secondary batteries, and modules.

BACKGROUND ART

Rapid improvement of portable electronic devices, such as cellphones and laptops, leads to requirements for higher capacity of batteries used for main powder supplies and uninterruptible power supplies of such portable devices. Then, electrochemical devices which are non-aqueous electrolytic batteries, such as lithium ion secondary batteries, have attracted attention because these batteries have a higher energy density than nickel-cadmium batteries and nickel-hydrogen batteries.

Typical examples of the electrolytic solution for lithium ion secondary batteries include non-aqueous electrolytic solutions prepared by dissolving an electrolyte (e.g., $LiPF_6$, $LiBF_4$, $LiN(CF_3SO_2)_2$, $LiCF_3(CF_2)_3SO_3$) in a solvent mixture of a high permittivity solvent (e.g., ethylene carbonate, propylene carbonate) and a low viscosity solvent (e.g., dimethyl carbonate, diethyl carbonate, ethyl methyl carbonate).

Negative electrode active materials of lithium ion secondary batteries mainly comprise a carbonaceous material which can absorb and desorb lithium ions. Typical examples thereof include natural graphite, artificial graphite, and amorphous carbon. Further, metal- or alloy-based negative electrodes comprising elements such as silicon and tin are also known to provide a much higher capacity. Positive electrode active materials of the above batteries mainly comprise a transition metal complex oxide which can absorb and desorb lithium ions. Typical examples of the transition metal include cobalt, nickel, manganese, and iron.

Such lithium ion secondary batteries comprise highly active positive and negative electrodes. These electrodes disadvantageously cause side reactions with the electrolytic solution, and such side reactions are known to decrease the charge and discharge capacities.

In order to improve the above battery characteristics, researchers have performed various studies on nonaqueous solvents and electrolytes.

Patent Literature 1 proposes to use an electrolytic solution comprising an organic compound having two or more nitrile groups. The nitrile groups are polarized to give a large dipole moment, and this large dipole moment restrains oxidative decomposition of the electrolytic solution on the positive electrode during charging at high voltage, thereby improving the battery characteristics.

Patent Literature 2 discloses an agent for forming a film on electrode surfaces, the agent comprising a specific nitrile compound, and thus improving the thermal stability of batteries.

Patent Literature 3 discloses a non-aqueous electrolyte secondary battery which comprises a fluorinated nitrile compound in an electrolytic solution, and thus has excellent charge and discharge efficiency and storage characteristics.

Patent Literature 4 discloses that addition of a compound having an isocyanate group to a non-aqueous electrolyte restrains a decomposing reaction of a solvent on the negative electrode, and thus improves the cycle characteristics of batteries.

Patent Literature 5 proposes to form a complex of an aliphatic nitrile compound with the surface of a positive electrode active material and thereby form a protective film on the positive electrode. This improves the safety of batteries against overcharge and/or physical impact from the outside.

Patent Literature 6 discloses a non-aqueous electrolytic battery which comprises an electrolytic solution containing an aliphatic cyano compound with three or more cyano groups and a linear or cyclic structure, and which thus has improved high-temperature characteristics.

Patent Literature 7 discloses a non-aqueous electrolytic battery which comprises a positive electrode containing a lithium transition metal compound powder with $pH \geq 10.8$ and capability of inserting and extracting lithium ions, and a non-aqueous electrolyte containing a compound with a carbon-nitrogen unsaturated bond, and which thus restrains gas generation during high-temperature storage.

CITATION LIST

Patent Literature

Patent Literature 1: JP H07-176322 A
Patent Literature 2: JP 2002-302649 A
Patent Literature 3: JP 2003-7336 A
Patent Literature 4: JP 2005-259641 A
Patent Literature 5: WO 2005/069423
Patent Literature 6: JP 2010-73367 A
Patent Literature 7: JP 2012-134137 A

SUMMARY OF INVENTION

Technical Problem

Current batteries are required to have much higher performance, in other words, they are required to achieve various battery characteristics, such as high capacity, high-temperature storage characteristics, and cycle characteristics, at high levels.

In order to achieve a high capacity, various methods have been studied such as a method in which the range of the electric potential to be used of a positive electrode is widened to a higher side; and a method in which an active material layer of an electrode is pressurized so that the density is increased, and thereby the volume occupied by the components except the active material inside the battery is reduced as small as possible. If the range of the electric potential to be used of a positive electrode is widened to a higher side, however, the activity of the positive electrode further increases so that the battery is likely to be deteriorated more rapidly due to the reaction between the positive electrode and the electrolytic solution. Especially, in the case of storing a charged battery at high temperature, the battery capacity is known to decrease due to side reactions between the electrodes and the electrolytic solution. In order to improve the storage characteristics, various studies have been performed on nonaqueous solvents and electrolytes. If the active material layer of an electrode is pressurized to have a higher density, the active material becomes difficult to use uniformly. Thus, a non-uniform reaction occurs to cause partial precipitation of lithium or to accelerate the deterioration of the active material, failing to provide sufficient characteristics.

Even a non-aqueous electrolyte containing any of the additives disclosed in Patent Literature documents 1, 4, and 5 fails to completely restrain deteriorating reactions of the electrolytic solution on the positive and negative electrodes. This results in insufficient high-temperature storage characteristics. In particular, with respect to the high-temperature storage characteristics, batteries need to restrain gas generation. However, conventional techniques fail to restrain the deterioration of battery characteristics and to restrain gas generation simultaneously.

The present invention is devised to solve the above problems, and aims to provide an electrolytic solution capable of restraining the reduction in capacity and gas generation during high-temperature storage in electrochemical devices which are non-aqueous electrolytic batteries, and a secondary battery comprising this electrolytic solution.

Solution to Problem

In order to achieve the above objects, the present inventors have performed various studies, and then found that an electrolytic solution containing a specific amount of a specific compound represented by the formula (1) can solve the above problems. Thereby, the inventors have completed the present invention.

Specifically, the present invention relates to an electrolytic solution comprising a nonaqueous solvent (I), an electrolyte salt (II), and 0.001 to 20% by mass of a compound represented by the following formula (1) or formula (A):

$$R^1\text{—}ORf^1\text{—}(ORf^2)_l\text{—}(ORf^3)_m\text{—}CN \quad (1)$$

wherein $R^1$ represents $CH_3\text{—}Rf\text{—}$, $CH_2F\text{—}Rf\text{—}$, or $CHF_2\text{—}Rf\text{—}$, and Rf in $R^1$ represents an alkylene group which may optionally have a fluorine atom, $Rf^1$, $Rf^2$, and $Rf^3$ may be the same as or different from each other, and individually represent a C1-C3 fluorinated alkylene group, and l and m may be the same as or different from each other, and individually an integer of 0 to 5, $$R^{41}\text{—}ORf^{41}\text{—}(ORf^{42})_l\text{—}(ORf^{43})_m\text{—}CN \quad (A)$$

wherein $R^{41}$ represents a C2-C9 group having an unsaturated bond, $Rf^{41}$, $Rf^{42}$, and $Rf^{43}$ may be the same as or different from each other and individually represent a C1-C3 alkylene group which may optionally have a fluorine atom, and l and m may be the same as or different from each other and individually an integer of 0 to 5.

The compound represented by the formula (1) or the formula (A) preferably has a molecular weight of 650 or lower. Rf preferably has at least one fluorine atom.

The nonaqueous solvent (I) preferably comprises a cyclic carbonate.

The nonaqueous solvent (I) preferably comprises a linear carbonate.

The electrolyte salt (II) is preferably a lithium salt.

The present invention also relates to an electrochemical device comprising the above electrolytic solution.

The present invention also relates to a lithium ion secondary battery comprising the above electrolytic solution.

The present invention also relates to a module comprising the above lithium ion secondary battery.

Advantageous Effects of Invention

The present invention can provide an electrolytic solution, an electrochemical device, a lithium ion secondary battery, and a module which can restrain gas generation and have excellent battery characteristics.

DESCRIPTION OF EMBODIMENTS

The electrolytic solution of the present invention comprises a nonaqueous solvent (I), an electrolyte salt (II), and a compound represented by the formula (1) or the formula (A), $$R^1\text{—}ORf^1\text{—}(ORf^2)_l\text{—}(ORf^3)_m\text{—}CN \quad (1)$$

wherein $R^1$ represents $CH_3\text{—}Rf\text{—}$, $CH_2F\text{—}Rf\text{—}$, or $CHF_2\text{—}Rf\text{—}$, and Rf in $R^1$ represents an alkylene group which may optionally have a fluorine atom, $Rf^1$, $Rf^2$, and $Rf^3$ may be the same as or different from each other, and individually represent a C1-C3 fluorinated alkylene group, and l and m may be the same as or different from each other, and individually represent an integer of 0 to 5, $$R^{41}\text{—}ORf^{41}\text{—}(ORf^{42})_l\text{—}(ORf^{43})_m\text{—}CN \quad (A)$$

wherein $R^{41}$ represents a C2-C9 group having an unsaturated bond, $Rf^{41}$, $Rf^{42}$, and $Rf^{43}$ may be the same as or different from each other, and individually represent a C1-C3 alkylene group which may optionally have a fluorine atom, and l and m may be the same as or different from each other, and individually represent an integer of 0 to 5.

Thus, use of the electrolytic solution of the present invention can provide electrochemical devices, such as lithium ion secondary batteries, which can restrain gas generation and which have high safety and excellent battery characteristics.

First described is the compound represented by the formula (1). In the formula (1), $R^1$ is $CH_3\text{—}Rf\text{—}$, $CH_2F\text{—}Rf\text{—}$, or $CHF_2\text{—}Rf\text{—}$. Rf in the formulas for $R^1$ is an alkylene group which may optionally have a fluorine atom.

For good compatibility with a solvent, $CH_3\text{—}Rf\text{—}$ is preferred.

The alkylene group which may optionally have a fluorine atom preferably has a carbon number of 1 to 4, and more preferably 2 to 4.

For good compatibility with a solvent, the alkylene group which may optionally have a fluorine atom is preferably a linear group.

Specifically, $R^1$ is preferably $CH_3CF_2CF_2\text{—}$, $CH_2FCF_2CF_2\text{—}$, $CF_2HCF_2CF_2\text{—}CH_3CF_2CF_2CF_2\text{—}$, or $CH_3CH_2CF_2CF_2\text{—}$.

In the formula (1), $Rf^1$, $Rf^2$, and $Rf^3$ may be the same as or different from each other, and individually represent a C1-C3 fluorinated alkylene group.

The C1-C3 fluorinated alkylene group is preferably selected from the below.

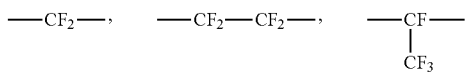

-continued

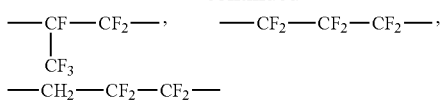

Further, l and m may be the same as or different from each other, and individually represent an integer of 0 to 5. Preferably, l and m are each an integer of 0 to 3, and more preferably 0 or 1.

The molecular weight of the compound represented by the formula (1) is preferably 100 or higher, more preferably 120 or higher, and still more preferably 150 or higher. The molecular weight is also preferably 650 or lower, and more preferably 450 or lower.

Specifically, the compound represented by the formula (1) is preferably selected from the below.

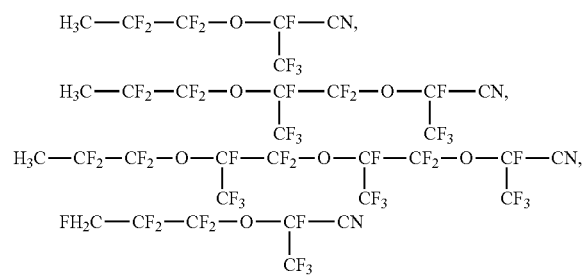

The amount of the compound represented by the formula (1) is 0.001 to 20% by mass in the electrolytic solution of the present invention. The compound in an amount within the above range leads to an electrolytic solution which restrains gas generation and which has excellent battery characteristics.

The amount of the compound represented by the formula (1) in the electrolytic solution is 0.001 to 20% by mass, preferably 0.01% by mass or more, and more preferably 0.1% by mass or more. The amount thereof is also preferably 8% by mass or less, and more preferably 6% by mass or less.

The compound represented by the formula (1) can be produced by any known production method.

Next described is the compound represented by the formula (A). In the formula (A), $R^{41}$ is a C2-C9 group having an unsaturated bond.

The group having an unsaturated bond preferably has a carbon number of 2 to 8, and more preferably 2 to 7.

The group having an unsaturated bond is a group having at least one double or triple bond. Examples of the group having an unsaturated bond include —N═C═S, —N═C═O, and —C≡N, and aryl groups, alkenyl groups, and alkynyl groups which may optionally be substituted with a halogen atom.

Examples of the halogen atom include a fluorine atom, a chlorine atom, a bromine atom, and an iodine atom. Particularly preferred is a fluorine atom because it is less likely to desorb.

Examples of the aryl group include a phenyl group and a benzyl group.

The aryl group which may optionally be substituted with a halogen atom is preferably a phenyl group, a benzyl group, or a fluorinated phenyl group.

Examples of the alkenyl group include a vinyl group ($CH_2$═CH—) and an allyl group ($CH_2$═CHCH$_2$—).

The alkenyl group which may optionally be substituted with a halogen atom is preferably an allyl group, a vinyl fluoride group, and an allyl fluoride group.

Examples of the allyl fluoride group include $CF_2$═CF—$CF_2$— and $CH_2$═CF—$CF_2$—.

Examples of the alkynyl group include an ethynyl group (CH≡C—) and a propargyl group (CH≡CCH$_2$—).

The alkynyl group which may optionally be substituted with a halogen atom is preferably an ethynyl fluoride group.

In order to provide an electrolytic solution which restrains gas generation and which has excellent battery characteristics, $R^{41}$ is preferably —N═C═S, —N═C═O, or $CH_2$═CF—$CF_2$—, and more preferably —N═C═O or $CH_2$═CF—$CF_2$—.

In the formula (A), $Rf^{41}$, $Rf^{42}$ and $Rf^{43}$ may be the same as or different from each other, and individually represent a C1-C3 alkylene group which may optionally have a fluorine atom.

Examples of the C1-C3 alkylene group which may optionally have a fluorine atom include C1-C3 alkylene groups and C1-C3 fluorinated alkylene groups.

The fluorinated alkylene group herein means an alkylene group in which at least one hydrogen atom is replaced by a fluorine atom.

$Rf^{41}$, $Rf^{42}$, and $Rf^{43}$ are each preferably a C1-C3 fluorinated alkylene group.

The C1-C3 alkylene group is preferably —CH$_2$—, —CH$_2$CH$_2$—, —CH(CH$_3$)—, or —CH$_2$CH$_2$CH$_2$—.

The C1-C3 fluorinated alkylene group is preferably selected from the below.

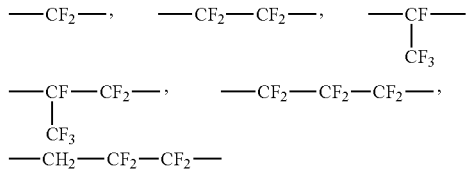

In the formula (A), l and m may be the same as or different from each other, and individually represent an integer of 0 to 5. Preferably, l and m may be the same as or different from each other, and individually represent an integer of 0 to 3, and more preferably 0 or 1.

The compound represented by the formula (A) preferably has a fluorine content of 20 to 70% by mass. The compound having a fluorine content within the above range can lead to an electrolytic solution which further restrains gas generation and which has excellent battery characteristics. The fluorine content is more preferably 25% by mass or more, whereas it is more preferably 65% by mass or less.

The fluorine content in the present invention is a value calculated by the following formula based on the structural formula (A).

$$\{(\text{Number of fluorine atoms} \times 19)/(\text{molecular weight of formula}(A))\} \times 100(\%)$$

The compound represented by the formula (A) is preferably selected from the below.

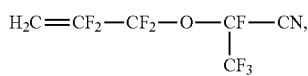

-continued

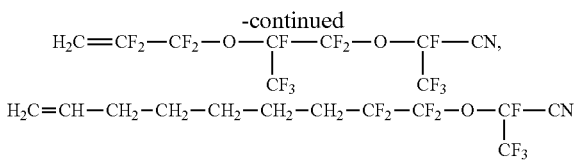

The compound represented by the formula (A) preferably has a molecular weight of 100 or higher, more preferably 120 or higher, and still more preferably 150 or higher. The molecular weight is also preferably 650 or lower, and more preferably 450 or lower.

The amount of the compound represented by the formula (A) is 0.001 to 20% by mass in the electrolytic solution of the present invention. The compound in an amount within the above range leads to an electrolytic solution which restrains gas generation and which has excellent battery characteristics.

The amount of the compound represented by the formula (A) in the electrolytic solution is 0.001 to 20% by mass, preferably 0.01% by mass or more, and more preferably 0.1% by mass or more. The amount thereof is also preferably 8% by mass or less, and more preferably 6% by mass or less.

The compound represented by the formula (A) can be produced by any known production method.

The electrolytic solution of the present invention may contain both the compound represented by the formula (1) and the compound represented by the formula (A). In this case, the sum of the amounts of the compounds is preferably 0.001 to 20% by mass, more preferably 0.01% by mass or more, and still more preferably 0.1% by mass or more, whereas the sum of the amounts thereof is more preferably 8% by mass or less, and still more preferably 6% by mass or less.

The electrolytic solution of the present invention contains a nonaqueous solvent (I) and an electrolyte salt (II).

The nonaqueous solvent (I) preferably comprises a cyclic carbonate.

Examples of the cyclic carbonate include fluorinated cyclic carbonates, fluorine-free cyclic carbonates, and cyclic carbonates having an unsaturated bond.

(Fluorinated Cyclic Carbonate)

Examples of the fluorinated cyclic carbonate include a fluorinated cyclic carbonate (B) represented by the following formula (B):

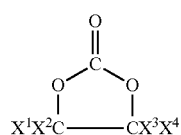

(B)

wherein $X^1$ to $X^4$ may be the same as or different from each other, and individually represent —H, —F, a fluorinated alkyl group which may optionally have an ether bond, or a fluorinated alkoxy group which may optionally have an ether bond; provided that at least one of $X^1$ to $X^4$ is —F.

The nonaqueous solvent (I) containing the fluorinated cyclic carbonate (B) allows an electrolytic solution that contains the solvent (I) to form a stable film on a negative electrode when the electrolytic solution is applied to a lithium ion secondary battery. Thereby, side reactions of the electrolytic solution on the negative electrode can suffi-ciently be restrained. This results in significantly stable, excellent charge and discharge characteristics.

The term "ether bond" herein means a bond represented by —O—.

In anticipation of a decrease in viscosity at low temperatures, an increase in flash point, and the improvement in solubility of an electrolyte salt, $X^1$ to $X^4$ in the formula (B) each preferably represent —H, —F, a fluorinated alkyl group (a), a fluorinated alkyl group (b) having an ether bond, or a fluorinated alkoxy group (c).

In the formula (B), at least one of $X^1$ to $X^4$ is —F. In order to achieve good permittivity and oxidation resistance, at least one or two of $X^1$ to $X^4$ is/are preferably —F.

The fluorinated alkyl group (a) is an alkyl group in which at least one hydrogen atom is replaced by a fluorine atom. The carbon number of the fluorinated alkyl group (a) is preferably 1 to 20, more preferably 2 to 17, still more preferably 2 to 7, and particularly preferably 2 to 5.

Too large a carbon number may lead to the deterioration in low-temperature characteristics and a decrease in solubility of an electrolyte salt. Too small a carbon number may lead to a decrease in solubility of an electrolyte salt, the deterioration in discharge efficiency, and an increase in viscosity, for example.

Examples of the fluorinated alkyl group (a) in which the carbon number is 1 include $CFH_2$—, $CF_2H$—, and $CF_3$—.

In order to achieve good solubility of an electrolyte salt, the fluorinated alkyl group (a) in which the carbon number is 2 or greater is preferably a fluorinated alkyl group represented by the following formula (a-1):

$$R^1\text{—}R^2\text{—} \quad (a\text{-}1)$$

wherein $R^1$ represents an alkyl group which may optionally have a fluorine atom and which has a carbon number of 1 or greater; and $R^2$ represents a C1-C3 alkylene group which may optionally have a fluorine atom, provided that at least one of $R^1$ or $R^2$ has a fluorine atom.

$R^1$ and $R^2$ each may further have an atom other than the carbon atom, hydrogen atom, and fluorine atom.

$R^1$ is an alkyl group which may optionally have a fluorine atom and which has a carbon number of 1 or greater. $R^1$ preferably represents a C1-C16 linear or branched alkyl group. The carbon number of $R^1$ is more preferably 1 to 6, and still more preferably 1 to 3.

Specifically, for example, $CH_3$—, $CH_3CH_2$—, $CH_3CH_2CH_2$—, $CH_3CH_2CH_2CH_2$—, and the groups represented by the following formulas:

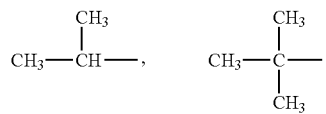

can be used as a linear or branched non-fluorinated alkyl group for $R^1$.

Examples of the linear alkyl group having a fluorine atom for $R^1$ include $CF_3$—, $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CH_2CH_2CH_2$—, $CF_3CF_2CF_2CH_2CH_2$—, $CF_3CH_2CF_2CH_2CH_2$—, $CF_3CF_2CF_2CF_2CH_2$—, $CF_3CF_2CH_2CF_2CH_2$—, $CF_3CF_2CH_2CH_2CH_2CH_2$—, $CF_3CF_2CH_2CF_2CH_2CH_2$—, HCF$_2$—, HCF$_2$CH$_2$—, HCF$_2$CF$_2$—, HCF$_2$CH$_2$CH$_2$—, HCF$_2$CF$_2$CH$_2$—, HCF$_2$CH$_2$CF$_2$—, HCF$_2$CF$_2$CH$_2$CH$_2$—, HCF$_2$CH$_2$CF$_2$CH$_2$—, HCF$_2$CF$_2$CF$_2$CF$_2$—, HCF$_2$CF$_2$CH$_2$CH$_2$CH$_2$—, HCF$_2$CH$_2$CF$_2$CH$_2$CH$_2$—, HCF$_2$CF$_2$CF$_2$CF$_2$CH$_2$—, HCF$_2$CF$_2$CF$_2$CH$_2$CH$_2$—, FCH$_2$—, FCH$_2$CH$_2$—, FCH$_2$CF$_2$—, FCH$_2$CF$_2$CH$_2$—, FCH$_2$CF$_2$CF$_2$—, CH$_3$CF$_2$CH$_2$—, CH$_3$CF$_2$CF$_2$—, CH$_3$CF$_2$CH$_2$CF$_2$—, CH$_3$CF$_2$CF$_2$CF$_2$—, CH$_3$CH$_2$CF$_2$CF$_2$—, CH$_3$CF$_2$CH$_2$CH$_2$—, CH$_3$CF$_2$CF$_2$CF$_2$CH$_2$—, CH$_3$CF$_2$CF$_2$CH$_2$CH$_2$—, CH$_3$CH$_2$CF$_2$CF$_2$CH$_2$—, CH$_3$CF$_2$CH$_2$CF$_2$CH$_2$—, CH$_3$CF$_2$CH$_2$CF$_2$CH$_2$CH$_2$—, CH$_3$CF$_2$CH$_2$CF$_2$CH$_2$CH$_2$—, HCFClCF$_2$CH$_2$—, HCF$_2$CFClCH$_2$—, HCF$_2$CFClCF$_2$CFClCH$_2$—, and HCFClCF$_2$CFClCF$_2$CH$_2$—.

Preferable examples of the branched alkyl group having a fluorine atom for R$^1$ include the groups represented by the following formulas.

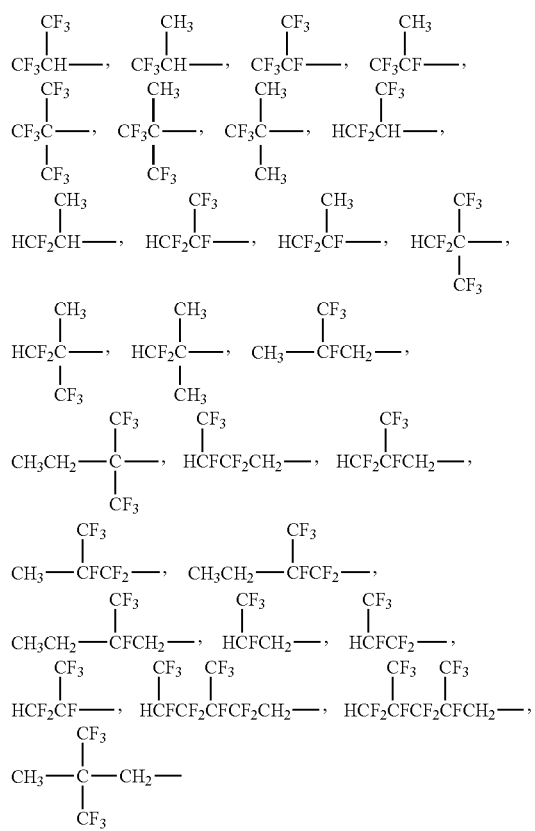

If the group has a branch represented by —CH$_3$ or —CF$_3$, for example, the viscosity is likely to increase. Thus, the number of such branches is more preferably small (one) or zero.

R$^2$ represents a C1-C3 alkylene group which may optionally have a fluorine atom. R$^2$ may be a linear or branched group. Examples of the minimum structural units constituting such a linear or branched alkylene group include the following. R$^2$ comprises one of these units or a combination of these units.

(i) Linear minimum structural units:

—CH$_2$—, —CHF—, —CF$_2$—, —CHCl—, —CFCl—, —CCl$_2$—

(ii) Branched minimum structural units:

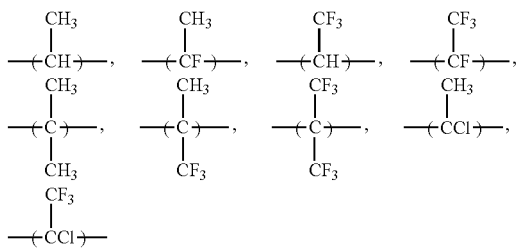

Preferred among these exemplified groups are structural units having no Cl because such units cause no dehydrochlorination due to a base so that the units are stable.

If R$^2$ is a linear group, the group consists only of the above linear minimum structural units, and it is preferably —CH$_2$—, —CH$_2$CH$_2$—, or CF$_2$—. In order to further improve the solubility of an electrolyte salt, —CH$_2$— or —CH$_2$CH$_2$— is more preferred.

If R$^2$ is a branched group, the group comprises at least one of the above branched minimum structural units. Preferable examples thereof include those represented by the formula —(CX$^a$X$^b$)— (wherein X$^a$ represents H, F, CH$_3$, or CF$_3$; and X$^b$ represents CH$_3$ or CF$_3$, when X$^b$ is CF$_3$, X$^a$ is H or CH$_3$). Such groups can much further improve the solubility of an electrolyte salt.

Preferably, for example, CF$_3$CF$_2$—, HCF$_2$CF$_2$—, H$_2$CFCF$_2$—, CH$_3$CF$_2$—, CF$_3$CF$_2$CF$_2$—, HCF$_2$CF$_2$CF$_2$—, H$_2$CFCF$_2$CF$_2$—, CH$_3$CF$_2$CF$_2$—, CF$_3$CH$_2$—, HCF$_2$CH$_2$—, CF$_3$CF$_2$CH$_2$—, HCF$_2$CF$_2$CH$_2$—, H$_2$CFCF$_2$CH$_2$—, CH$_3$CF$_2$CH$_2$—, CF$_3$CF$_2$CF$_2$CH$_2$—, CF$_3$CF$_2$CF$_2$CF$_2$CH$_2$—, HCF$_2$CF$_2$CF$_2$CH$_2$—, H$_2$CFCF$_2$CF$_2$CH$_2$—, CH$_3$CF$_2$CF$_2$CH$_2$—, CF$_3$CH$_2$CH$_2$—, HCF$_2$CH$_2$CH$_2$—, CF$_3$CF$_2$CH$_2$CH$_2$—, HCF$_2$CF$_2$CH$_2$CH$_2$—, H$_2$CFCF$_2$CH$_2$CH$_2$—, CH$_3$CF$_2$CH$_2$CH$_2$—, CF$_3$CF$_2$CF$_2$CH$_2$CH$_2$—, HCF$_2$CF$_2$CF$_2$CH$_2$CH$_2$—, H$_2$CFCF$_2$CF$_2$CH$_2$CH$_2$—, CH$_3$CF$_2$CF$_2$CH$_2$CH$_2$—, and the groups represented by the following formulas:

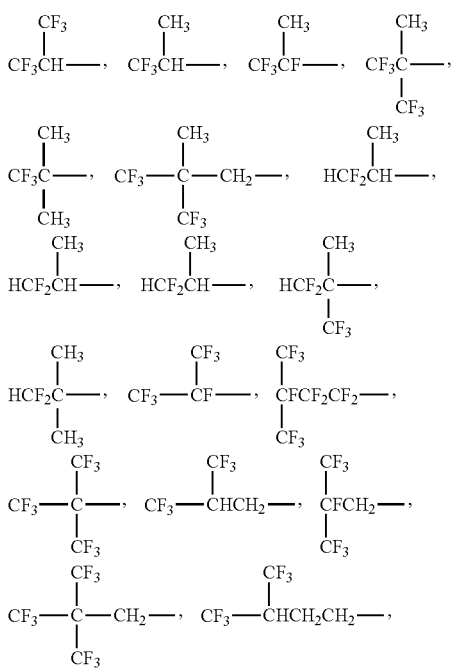

CF₃CFCH₂CH₂—, CF₃—C(CF₃)(CF₃)—CH₂CH₂— can be used as a fluorinated alkyl group (a).

Specifically, for example, CF₃CH₂—, HCF₂CH₂—, CF₃CF₂CH₂—, HCF₂CF₂CH₂—, H₂CFCF₂CH₂—, CH₃CF₂CH₂—, CF₃CF₂CF₂CH₂—, HCF₂CF₂CF₂CH₂—, H₂CFCF₂CF₂CH₂—, CH₃CF₂CF₂CH₂—, CF₃CH₂CH₂—, HCF₂CH₂CH₂—, CF₃CF₂CH₂CH₂—, HCF₂CF₂CH₂CH₂—, H₂CFCF₂CH₂CH₂—, CH₃CF₂CH₂CH₂—, CF₃CF₂CF₂CH₂CH₂—, HCF₂CF₂CF₂CH₂CH₂—, H₂CFCF₂CF₂CH₂CH₂—, CH₃CF₂CF₂CH₂CH₂—, and the groups represented by the following formulas:

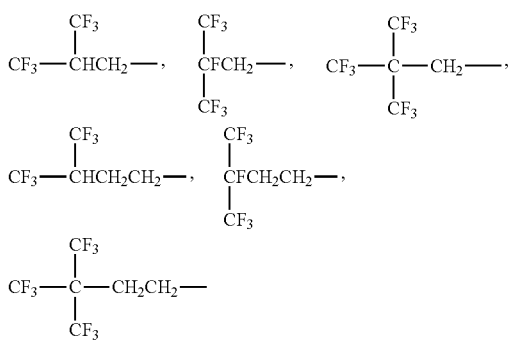

can preferably be used as a linear fluorinated alkyl group (a) for R².

Specifically, for example, the groups represented by the following formulas:

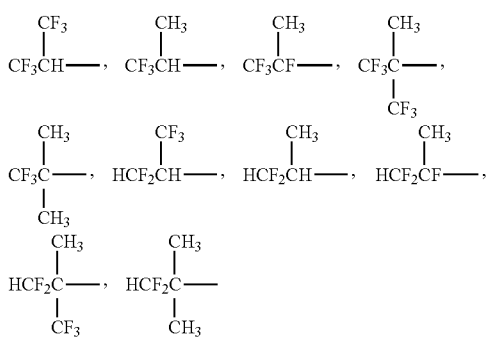

can preferably be used as a branched fluorinated alkyl group (a) for R².

The fluorinated alkyl group (b) having an ether bond is an alkyl group having an ether bond in which at least one hydrogen atom is replaced by a fluorine atom. The fluorinated alkyl group (b) having an ether bond preferably has a carbon number of 2 to 17. Too large a carbon number may increase the viscosity of the fluorinated cyclic carbonate (B) and may increase the number of fluorine-containing groups, thereby reducing the solubility of an electrolyte salt due to a reduction in permittivity and reducing the compatibility with other solvents. Thus, the carbon number of the fluorinated alkyl group (b) having an ether bond is preferably 2 to 10, and more preferably 2 to 7.

The alkylene group which constitutes the ether segment of the fluorinated alkyl group (b) having an ether bond may be a linear or branched alkylene group. Examples of the minimum structural units constituting such a linear or branched alkylene group are as follows.

(i) Linear minimum structural units:
—CH₂—, —CHF—, —CF₂—, —CHCl—, —CFCl—, —CCl₂—

(ii) Branched minimum structural units:

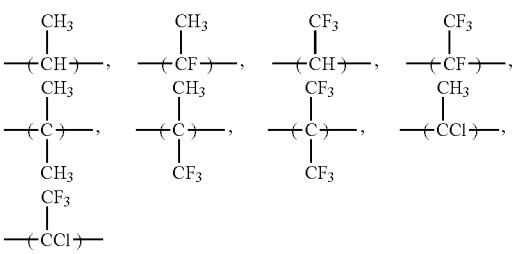

The alkylene group may be formed by one of these minimum structural units alone, or may be formed by a combination of linear units (i), of branched units (ii), or of a linear unit (i) and a branched unit (ii). Preferable examples will be mentioned in detail later.

Preferred among these exemplified groups are structural units having no Cl because such groups cause no dehydrochlorination due to a base so that the groups are more stable.

Still more preferable examples of the fluorinated alkyl group (b) having an ether bond include those represented by the formula (b-1):

$$R^3—(OR^4)_{n1}— \qquad (b\text{-}1)$$

wherein $R^3$ preferably represents a C1-C6 alkyl group which may optionally have a fluorine atom; $R^4$ preferably represents a C1-C4 alkylene group which may optionally have a fluorine atom; and n1 is an integer of 1 to 3; provided that at least one of $R^3$ or $R^4$ has a fluorine atom.

Examples of the groups for $R^3$ and $R^4$ include the following, and any combination of these groups can provide the fluorinated alkyl group (b) having an ether bond represented by the formula (b-1). Still, the groups are not limited thereto.

(1) $R^3$ is preferably an alkyl group represented by the formula: $X^c{}_3C—(R^5)_{n2}—$ (wherein three $X^c$'s may be the same as or different from each other, and individually represent H or F; $R^5$ represents a C1-C5 alkylene group which may optionally have a fluorine atom; and n2 is 0 or 1.

If n2 is 0, $R^3$ is CH₃—, CF₃—, HCF₂—, or H₂CF—.

If n2 is 1, specific examples of the linear group for $R^3$ include CF₃CH₂—, CF₃CF₂—, CF₃CH₂CH₂—, CF₃CF₂CH₂—, CF₃CF₂CF₂—, CF₃CH₂CF₂—, CF₃CH₂CH₂CH₂—, CF₃CF₂CH₂CH₂—, CF₃CH₂CF₂CH₂—, CF₃CF₂CF₂CH₂—, CF₃CF₂CF₂CF₂—, CF₃CF₂CH₂CF₂—, CF₃CH₂CH₂CH₂CH₂—, CF₃CF₂CH₂CH₂CH₂—, CF₃CH₂CF₂CH₂CH₂—, CF₃CF₂CF₂CH₂CH₂—, CF₃CF₂CF₂CF₂CH₂—, CF₃CF₂CH₂CH₂CH₂CH₂—, CF₃CF₂CF₂CF₂CH₂CH₂—, CF₃CF₂CF₂CF₂CH₂CH₂—, HCF₂CH₂—, HCF₂CF₂—, HCF₂CH₂CH₂—, HCF₂CF₂CH₂—, HCF₂CH₂CF₂—, HCF₂CF₂CH₂CH₂—, HCF₂CF₂CF₂CH₂—, HCF₂CF₂CF₂CF₂—, HCF₂CF₂CH₂CH₂CH₂—, HCF₂CH₂CH₂CH₂CH₂—, HCF₂CF₂CF₂CF₂CH₂—, HCF₂CF₂CF₂CF₂CH₂CH₂—, FCH₂CH₂—, FCH₂CF₂—, FCH₂CF₂CH₂—, FCH$_2$CF$_2$CH$_2$—, CH$_3$CF$_2$—, CH$_3$CH$_2$—, CH$_3$CF$_2$CH$_2$—, CH$_3$CF$_2$CF$_2$—, CH$_3$CH$_2$CH$_2$—, CH$_3$CF$_2$CH$_2$CF$_2$—, CH$_3$CF$_2$CF$_2$CF$_2$—, CH$_3$CH$_2$CF$_2$CF$_2$—, CH$_3$CH$_2$CH$_2$CH$_2$—, CH$_3$CF$_2$CH$_2$CF$_2$CH$_2$—, CH$_3$CF$_2$CF$_2$CF$_2$CH$_2$—, CH$_3$CF$_2$CF$_2$CH$_2$CH$_2$—, CH$_3$CH$_2$CF$_2$CF$_2$CH$_2$—, CH$_3$CH$_2$CF$_2$CH$_2$CH$_2$—, CH$_3$CH$_2$CF$_2$CF$_2$CH$_2$CH$_2$—, CH$_3$CH$_2$CF$_2$CF$_2$CH$_2$CH$_2$—, and CH$_3$CF$_2$CH$_2$CF$_2$CH$_2$CH$_2$—.

If n2 is 1, for example, the groups represented by the following formulas:

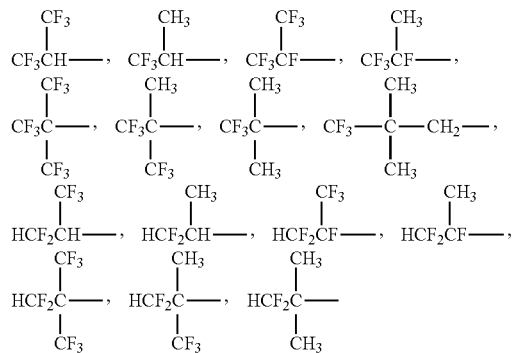

can be used as a branched group for R$^3$.

If the group for R$^3$ has a branch such as —CH$_3$ or —CF$_3$, the viscosity is likely to increase. Thus, the group for R$^3$ is more preferably a linear group.

(2) In the segment —(OR$^4$)$_{n1}$— of the formula (b-1), n1 is an integer of 1 to 3, and preferably 1 or 2. If n1 is 2 or 3, R$^4$'s may be the same as or different from each other.

Preferable specific examples of the group for R$^4$ include the following linear or branched groups.

Examples of the linear group include —CH$_2$—, —CHF—, —CF$_2$—, —CH$_2$CH$_2$—, —CF$_2$CH$_2$—, —CF$_2$CF$_2$—, —CH$_2$CF$_2$—, —CH$_2$CH$_2$CH$_2$—, —CH$_2$CH$_2$CF$_2$—, —CH$_2$CF$_2$CH$_2$—, —CH$_2$CF$_2$CF$_2$—, —CF$_2$CH$_2$CH$_2$—, —CF$_2$CF$_2$CH$_2$—, —CF$_2$CH$_2$CF$_2$—, and —CF$_2$CF$_2$CF$_2$—.

The groups represented by the following formulas:

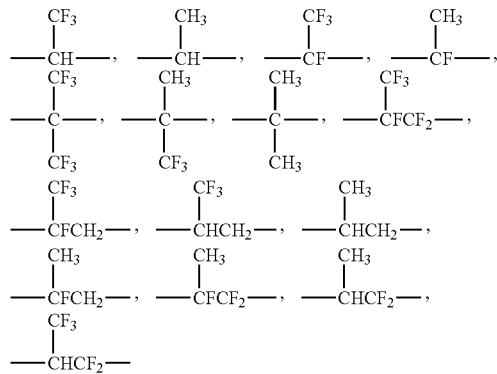

can be used as a branched group.

The fluorinated alkoxy group (c) is an alkoxy group in which at least one hydrogen atom is replaced by a fluorine atom. The fluorinated alkoxy group (c) preferably has a carbon number of 1 to 17. The carbon number is more preferably 1 to 6.

The fluorinated alkoxy group (c) is particularly preferably a fluorinated alkoxy group represented by the formula: X$^d{_3}$C—(R$^6$)$_{n3}$—O— (wherein three X$^d$'s may be the same as or different from each other, and individually represent H or F; R$^6$ preferably represents a C1-C5 alkylene group which may optionally have a fluorine atom; and n3 is 0 or 1; provided that any of the three X$^d$'s is a fluorine atom.

Specific examples of the fluorinated alkoxy group (c) include fluorinated alkoxy groups which are formed by bonding an oxygen atom to an end of the alkyl group exemplified for R$^1$ in the formula (a-1).

The fluorinated alkyl group (a), the fluorinated alkyl group (b) having an ether bond, and the fluorinated alkoxy group (c) each preferably have a fluorine content of 10% by mass or more. Too low a fluorine content may fail to achieve an effect of reducing the viscosity at low temperatures and an effect of increasing the flash point. Thus, the fluorine content is preferably 10% by mass or more, more preferably 12% by mass or more, and still more preferably 15% by mass or more. The upper limit thereof is usually 76% by mass.

The fluorine contents of the fluorinated alkyl group (a), the fluorinated alkyl group (b) having an ether bond, and the fluorinated alkoxy group (c) are values calculated by the following formula based on the respective structural formulas.

{(Number of fluorine atoms×19)/(formula weight of the formula)}×100(%)

In order to achieve good permittivity and oxidation resistance, the fluorine content in the whole fluorinated cyclic carbonate (B) is preferably 10% by mass or more, and more preferably 15% by mass or more. The upper limit thereof is usually 76% by mass.

The fluorine content in the whole fluorinated cyclic carbonate (B) is a value calculated by the following formula based on the structural formula of the fluorinated cyclic carbonate (B).

{(Number of fluorine atoms×19)/(molecular weight of fluorinated cyclic carbonate(B))}×100(%)

Specific examples of the fluorinated cyclic carbonate (B) include those represented by the following formulas:

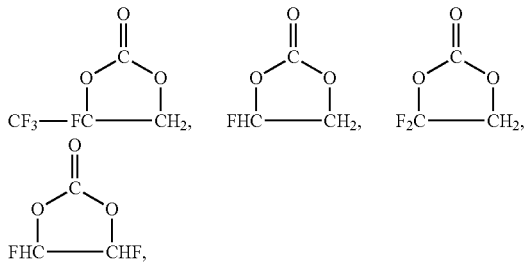

which are fluorinated cyclic carbonates having a high withstand voltage and leading to good solubility of an electrolyte salt.

In addition, those represented by the following formulas:

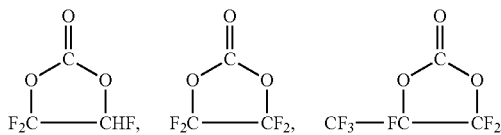

can also be used.

The fluorinated cyclic carbonate (B) in the electrolytic solution of the present invention is not limited to the aforementioned specific examples.

Examples of the fluorinated cyclic carbonate include a fluorinated cyclic carbonate (C) represented by the formula (C):

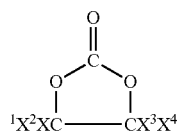

wherein $X^1$ to $X^4$ may be the same as or different from each other, and individually represent —H, a fluorinated alkyl group which may optionally have an ether bond, or a fluorinated alkoxy group which may optionally have an ether bond.

Containing the fluorinated cyclic carbonate (C) leads to more stable, excellent charge and discharge characteristics.

The term "ether bond" herein means a bond represented by —O—.

In the formula (C), at least one of $X^1$ to $X^4$ is —H, a fluorinated alkyl group which may optionally have an ether bond, or a fluorinated alkoxy group which may optionally have an ether bond. In order to achieve good permittivity and oxidation resistance, one or two of $X^1$ to $X^4$ is/are preferably —H, a fluorinated alkyl group which may optionally have an ether bond, or a fluorinated alkoxy group which may optionally have an ether bond.

In anticipation of a decrease in viscosity at low temperatures, an increase in flash point, and the improvement in solubility of an electrolyte salt, at least one of $X^1$ to $X^4$ is preferably a fluorinated alkyl group (a), a fluorinated alkyl group (b) which may optionally have an ether bond, or a fluorinated alkoxy group (c).

Examples of the fluorinated alkyl group (a), the fluorinated alkyl group (b) having an ether bond, and the fluorinated alkoxy group (c) include the same fluorinated alkyl groups (a), fluorinated alkyl groups (b) having an ether bond, and fluorinated alkoxy groups (c) for $X^1$ to $X^4$ in the formula (B).

Specifically, for example, the fluorinated cyclic carbonate (C) may be the following.

Those represented by the following formulas:

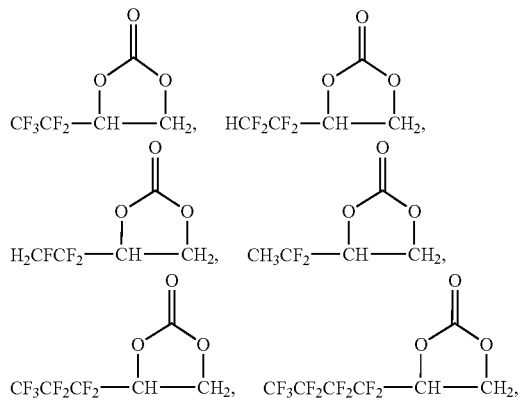

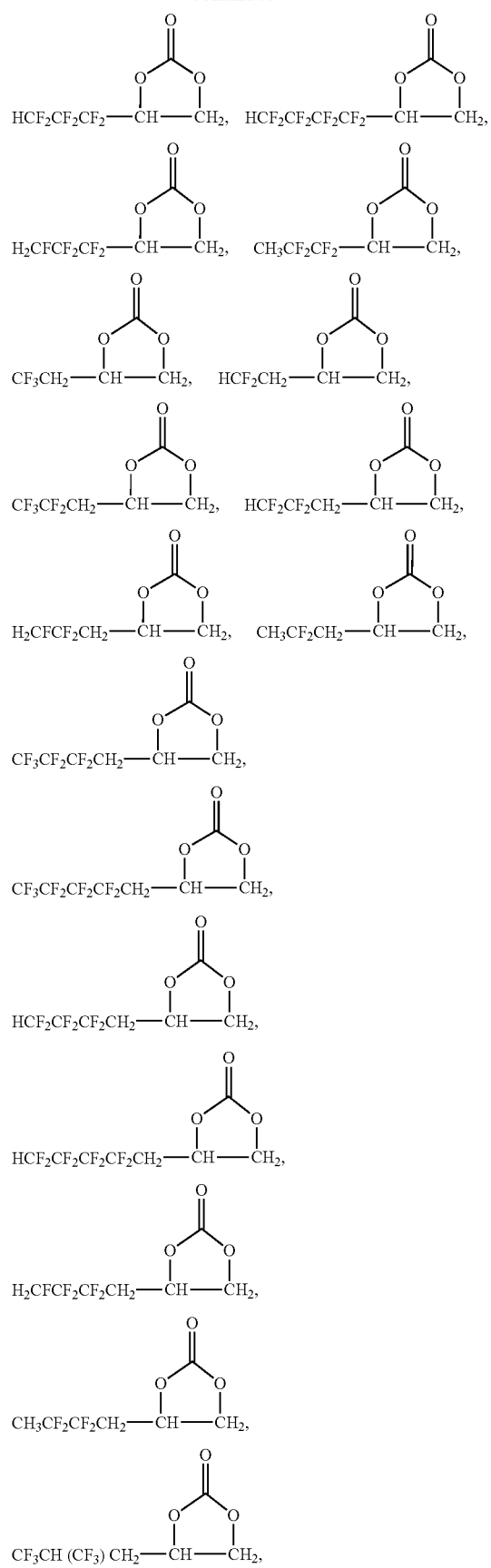

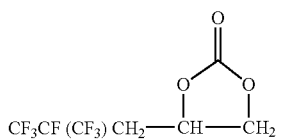

can be used as a fluorinated cyclic carbonate (C) represented by the formula (C) in which at least one of $X^1$ to $X^4$ is a fluorinated alkyl group (a) and the others thereof are —H.

Specific examples of the fluorinated cyclic carbonate (C) represented by the formula (C) in which at least one of $X^1$ to $X^4$ is a fluorinated alkyl group (b) having an ether bond or a fluorinated alkoxy group (c) and the others thereof are —H include those represented by the following formulas.

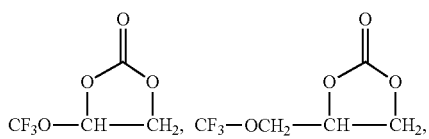

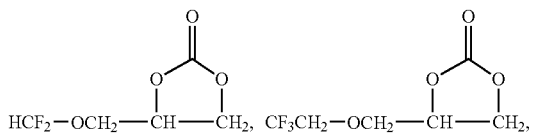

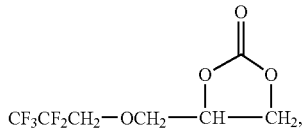

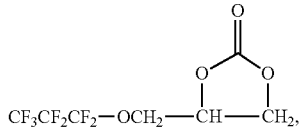

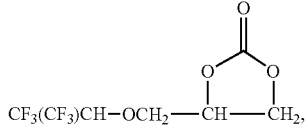

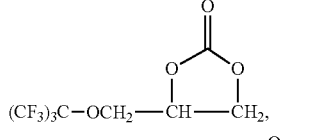

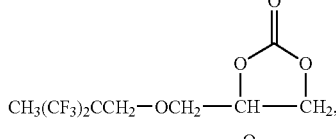

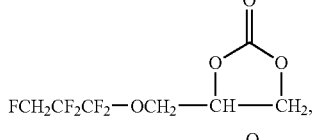

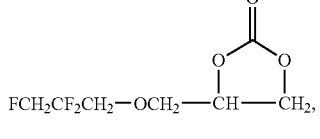

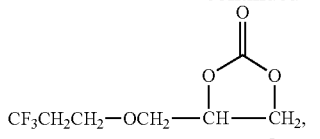

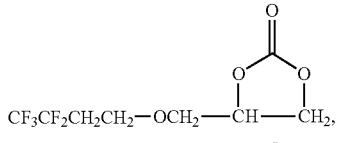

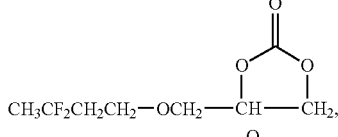

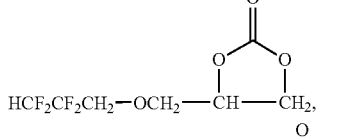

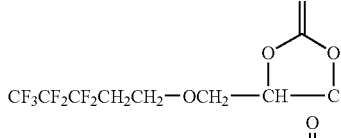

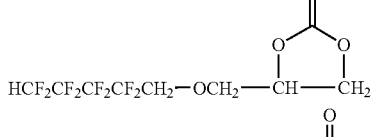

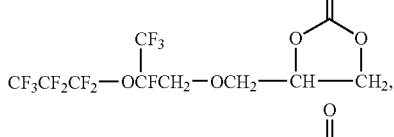

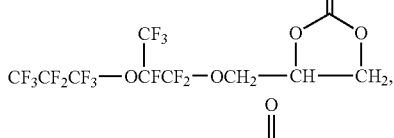

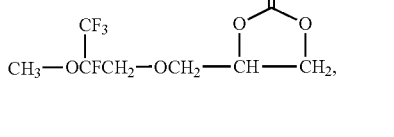

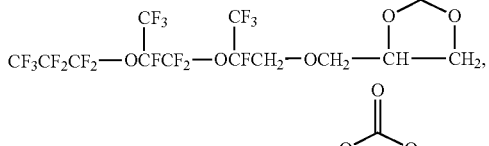

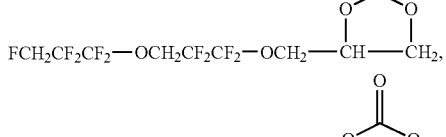

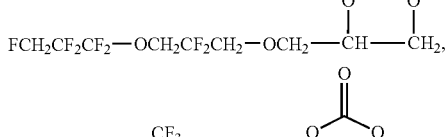

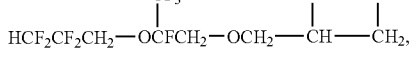

-continued

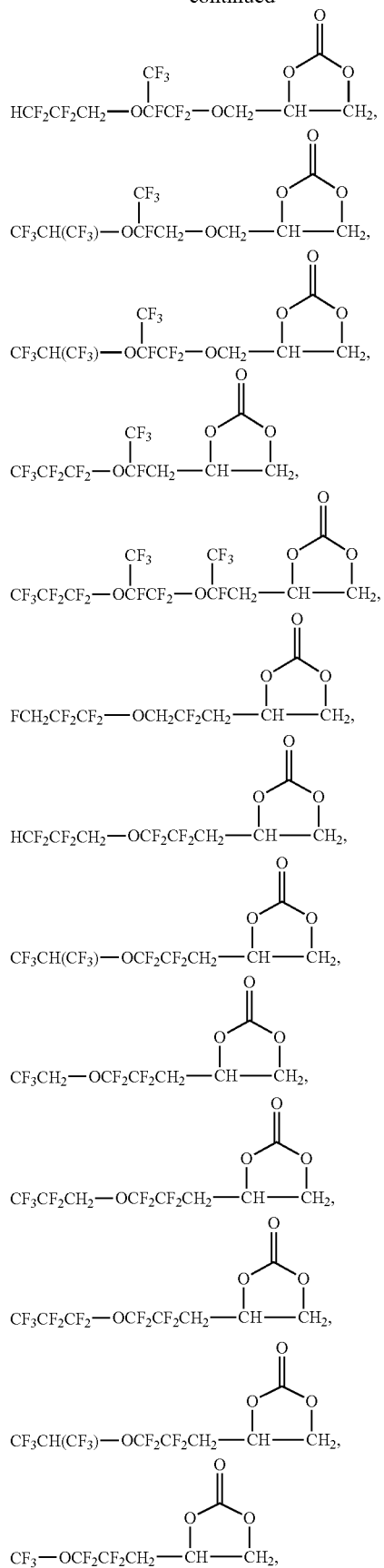

-continued

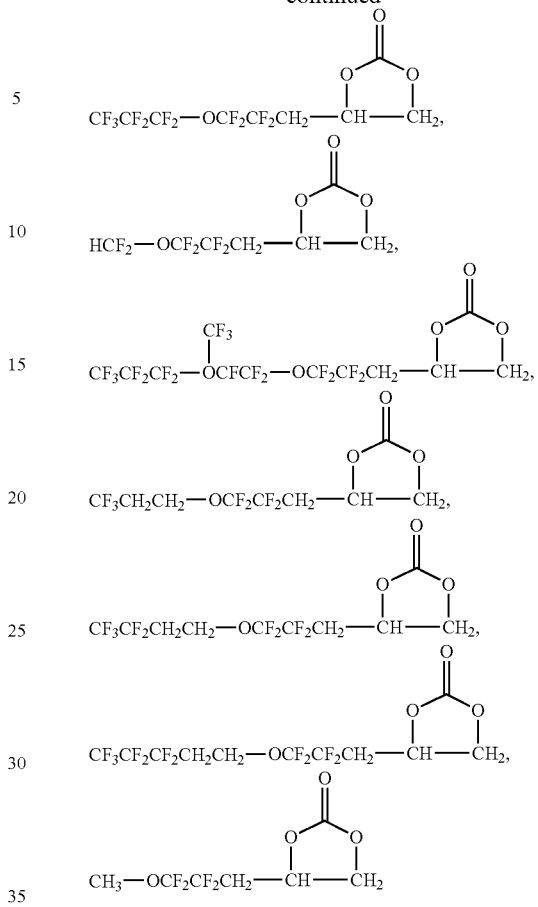

The fluorinated cyclic carbonate (C) is not limited to the above specific examples.

The amount of the fluorinated cyclic carbonates (B) and (C) in 100% by volume of the nonaqueous solvent (I) is preferably 1% by volume or more, more preferably 5% by volume or more, and still more preferably 10% by volume or more, whereas the amount thereof is preferably 50% by volume or less, more preferably 35% by volume or less, and still more preferably 25% by volume or less.

(Fluorine-Free Cyclic Carbonate)

Examples of the fluorine-free cyclic carbonate include cyclic carbonates having a C2-C4 alkylene group.

Specific examples of the fluorine-free cyclic carbonates having a C2-C4 alkylene group include ethylene carbonate, propylene carbonate, and butylene carbonate. Particularly preferred are ethylene carbonate and propylene carbonate because they can improve the battery characteristics owing to the improvement in degree of dissociation of lithium ions.

These fluorine-free cyclic carbonates may be used alone or in any combination of two or more at any ratio.

The fluorine-free cyclic carbonate may be used in any amount that does not significantly deteriorate the effects of the present invention. For a single fluorine-free cyclic carbonate, the amount thereof is preferably 5% by volume or more, and more preferably 10% by volume or more in 100% by volume of the nonaqueous solvent (I). The fluorine-free cyclic carbonate in an amount within this range can eliminate a decrease in electric conductivity due to a decrease in permittivity of the electrolytic solution, and thus is likely to give large-current discharge characteristics, stability against a negative electrode, and cycle characteristics of electrochemical devices comprising the electrolytic solution each within a favorable range.

The amount thereof is preferably 95% by volume or less, more preferably 90% by volume or less, and still more preferably 85% by volume or less. The fluorine-free cyclic carbonate in an amount within this range can provide a viscosity of the electrolytic solution within an appropriate range and restrain a decrease in ion conductivity, thereby giving load characteristics within a favorable range to electrochemical devices comprising the electrolytic solution.

(Cyclic Carbonate Having Unsaturated Bond)

The cyclic carbonate having an unsaturated bond (hereinafter, also referred to as an "unsaturated cyclic carbonate") can be any unsaturated carbonate which is a cyclic carbonate having a carbon-carbon double bond or a carbon-carbon triple bond. The unsaturated cyclic carbonate includes cyclic carbonates having an aromatic ring.

Examples of the unsaturated cyclic carbonate include vinylene carbonates, ethylene carbonates substituted with a substituent having an aromatic ring, a carbon-carbon double bond, or a carbon-carbon triple bond, phenyl carbonates, vinyl carbonates, allyl carbonates, and catechol carbonates.

Examples of the vinylene carbonates include vinylene carbonate, methyl vinylene carbonate, 4,5-dimethyl vinylene carbonate, phenyl vinylene carbonate, 4,5-diphenyl vinylene carbonate, vinyl vinylene carbonate, 4,5-divinyl vinylene carbonate, allyl vinylene carbonate, 4,5-diallyl vinylene carbonate, 4-fluorovinylene carbonate, 4-fluoro-5-methyl vinylene carbonate, 4-fluoro-5-phenyl vinylene carbonate, 4-fluoro-5-vinyl vinylene carbonate, and 4-allyl-5-fluorovinylene carbonate.

Specific examples of the ethylene carbonates substituted with a substituent having an aromatic ring, a carbon-carbon double bond, or a carbon-carbon triple bond include vinyl ethylene carbonate, 4,5-divinyl ethylene carbonate, 4-methyl-5-vinyl ethylene carbonate, 4-allyl-5-vinyl ethylene carbonate, ethynyl ethylene carbonate, 4,5-diethynyl ethylene carbonate, 4-methyl-5-ethynyl ethylene carbonate, 4-vinyl-5-ethynyl ethylene carbonate, 4-allyl-5-ethynyl ethylene carbonate, phenyl ethylene carbonate, 4,5-diphenyl ethylene carbonate, 4-phenyl-5-vinyl ethylene carbonate, 4-allyl-5-phenyl ethylene carbonate, allyl ethylene carbonate, 4,5-diallyl ethylene carbonate, and 4-methyl-5-allyl ethylene carbonate.

Particularly preferable examples of the unsaturated cyclic carbonate to be used in combination with the compound represented by the formula (1) include vinylene carbonate, methyl vinylene carbonate, 4,5-dimethyl vinylene carbonate, vinyl vinylene carbonate, 4,5-vinyl vinylene carbonate, allyl vinylene carbonate, 4,5-diallyl vinylene carbonate, vinyl ethylene carbonate, 4,5-divinyl ethylene carbonate, 4-methyl-5-vinyl ethylene carbonate, allyl ethylene carbonate, 4,5-diallyl ethylene carbonate, 4-methyl-5-allyl ethylene carbonate, 4-allyl-5-vinyl ethylene carbonate, ethynyl ethylene carbonate, 4,5-diethynyl ethylene carbonate, 4-methyl-5-ethynyl ethylene carbonate, and 4-vinyl-5-ethynyl ethylene carbonate. Particularly preferred are vinylene carbonate, vinyl ethylene carbonate, and ethynyl ethylene carbonate because they can form a more stable interface protective film.

The unsaturated cyclic carbonate may have any molecular weight that does not significantly deteriorate the effects of the present invention. The molecular weight is preferably 80 or higher and 250 or lower. The unsaturated cyclic carbonate having a molecular weight within this range is likely to assure the solubility in a non-aqueous electrolytic solution and enable sufficient achievement of the effects of the present invention. The molecular weight of the unsaturated cyclic carbonate is more preferably 85 or higher, and more preferably 150 or lower.

The unsaturated cyclic carbonate can be produced by any known production method.

The unsaturated cyclic carbonates can be used alone or in combination of two or more at any ratio.

The unsaturated cyclic carbonate can be used in any amount that does not significantly deteriorate the effects of the present invention. The amount of the unsaturated cyclic carbonate is preferably 0.001% by mass or more, more preferably 0.01% by mass or more, and still more preferably 0.1% by mass or more in 100% by mass of the nonaqueous solvent (I). The amount thereof is also preferably 5% by mass or less, more preferably 4% by mass or less, and still more preferably 3% by mass or less. The carbonate in an amount within the above range is likely to allow electrochemical devices comprising the electrolytic solution to exert a sufficient effect of improving the cycle characteristics and eliminate the deterioration in high-temperature storage characteristics, an increase in the amount of gas generated, and a decrease in discharge capacity retention ratio.

The nonaqueous solvent (I) preferably contains a linear carbonate.

Examples of the linear carbonate include non-fluorinated linear carbonates and fluorinated linear carbonates.

(Non-Fluorinated Linear Carbonate)

The non-fluorinated linear carbonate is preferably a C3-C7 linear carbonate, and more preferably a C3-C7 dialkyl carbonate, having no fluorine atom.

Examples of the linear carbonate include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, and t-butyl ethyl carbonate.

Preferred are dimethyl carbonate, diethyl carbonate, di-n-propyl carbonate, diisopropyl carbonate, n-propyl isopropyl carbonate, ethyl methyl carbonate, and methyl-n-propyl carbonate, and particularly preferred are dimethyl carbonate, diethyl carbonate, and ethyl methyl carbonate.

These non-fluorinated linear carbonates may be used alone or in combination of two or more at any ratio.

(Fluorinated Linear Carbonate)

The fluorinated linear carbonate is a linear carbonate having a fluorine atom.

The number of fluorine atoms in the fluorinated linear carbonate may be any number that is one or greater. It is usually six or smaller, and preferably four or smaller. If the fluorinated linear carbonate has multiple fluorine atoms, the fluorine atoms may bond to the same carbon atom, or may bond to different carbon atoms.

Examples of the fluorinated linear carbonate include fluorinated dimethyl carbonate and derivatives thereof, fluorinated ethyl methyl carbonate and derivatives thereof, and fluorinated diethyl carbonate and derivatives thereof.

Examples of the fluorinated dimethyl carbonate and derivatives thereof include fluoromethyl methyl carbonate, difluoromethyl methyl carbonate, trifluoromethyl methyl carbonate, bis(fluoromethyl) carbonate, bis(difluoro)methyl carbonate, and bis(trifluoromethyl) carbonate.

Examples of the fluorinated ethyl methyl carbonate and derivatives thereof include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of the fluorinated diethyl carbonate and derivatives thereof include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, and bis(2,2,2-trifluoroethyl) carbonate.

These fluorinated linear carbonates may be used alone or in combination of two or more at any ratio.

The amount of the linear carbonate is preferably 5% by volume or more, more preferably 10% by volume or more, and still more preferably 15% by volume or more, in 100% by volume of the nonaqueous solvent (I). Such a lower limit allows the electrolytic solution to have a viscosity within an appropriate range, restrains a reduction in ion conductivity, and allows electrochemical devices comprising the electrolytic solution to have large-current discharge characteristics within a favorable range. The amount of the linear carbonate is preferably 90% by volume or less, and more preferably 85% by volume or less, in 100% by volume of the nonaqueous solvent (I). Such an upper limit makes it possible to avoid a reduction in electric conductivity due to a reduction in permittivity of the electrolytic solution, and is likely to allow electrochemical devices comprising the electrolytic solution to have large-current discharge characteristics within a favorable range.

The nonaqueous solvent (I) may further comprise cyclic carboxylates, acyclic carboxylates, ether compounds, and other like compounds.

(Cyclic Carboxylate)

The cyclic carboxylate preferably has 3 to 12 carbon atoms.

Specific examples thereof include gamma-butyrolactone, gamma-valerolactone, gamma-caprolactone, and epsilon-caprolactone. Particularly preferred is gamma-butyrolactone because it can improve the battery characteristics owing to the improvement in degree of dissociation of lithium ions.

Cyclic carboxylates may be used alone or in combination of two or more at any ratio.

In general, the amount of the cyclic carboxylate is preferably 5% by volume or more, and more preferably 10% by volume or more, in 100% by volume of the nonaqueous solvent. The cyclic carbonate in an amount within this range can improve the electric conductivity of the non-aqueous electrolytic solution, making it easy to improve the large-current discharge characteristics of electrochemical devices comprising the electrolytic solution. The amount of the cyclic carboxylate is also preferably 50% by volume or less, and more preferably 40% by volume or less. Such an upper limit may allow the non-aqueous electrolytic solution to have a viscosity within an appropriate range, may make it possible to avoid a reduction in electric conductivity, may restrain an increase in resistance of the negative electrode, and may allow non-aqueous electrolytic solution secondary battery to have large-current discharge characteristics within a favorable range.

(Acyclic Carboxylate)

The acyclic carboxylate is preferably a C3-C7 acyclic carboxylate. Specific examples thereof include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

Preferred are methyl acetate, ethyl acetate, n-propyl acetate, n-butyl acetate, methyl propionate, ethyl propionate, n-propyl propionate, isopropyl propionate, methyl butyrate, and ethyl butyrate, for example, in order to improve the ion conductivity owing to a reduction in viscosity.

Acyclic carboxylates may be used alone or in combination of two or more at any ratio.

In general, the amount of the acyclic carboxylate is preferably 10% by volume or more, and more preferably 15% by volume or more, in 100% by volume of the nonaqueous solvent. Such a lower limit makes it easy to improve the electric conductivity of the electrolytic solution and improve the large-current discharge characteristics of electrochemical devices comprising the electrolytic solution. The amount of the acyclic carboxylate is also preferably 60% by volume or less, and more preferably 50% by volume or less, in 100% by volume of the nonaqueous solvent. Such an upper limit makes it easy to restrain an increase in resistance of the negative electrode, and allow electrochemical devices comprising the electrolytic solution to have large-current discharge characteristics and cycle characteristics within favorable ranges.

(Ether Compound)

The ether compound is preferably a C3-C10 acyclic ether or a C3-C6 cyclic ether in which part of hydrogen atoms is replaced by a fluorine atom.

Examples of the C3-C10 acyclic ether include diethyl ether, di(2-fluoroethyl) ether, di(2,2-difluoroethyl) ether, di(2,2,2-trifluoroethyl) ether, ethyl(2-fluoroethyl) ether, ethyl(2,2,2-trifluoroethyl) ether, ethyl(1,1,2,2-tetrafluoroethyl) ether, (2-fluoroethyl) (2,2,2-trifluoroethyl) ether, (2-fluoroethyl) (1,1,2,2-tetrafluoroethyl) ether, (2,2,2-trifluoroethyl) (1,1,2,2-tetrafluoroethyl) ether, ethyl-n-propyl ether, ethyl(3-fluoro-n-propyl) ether, ethyl(3,3,3-trifluoro-n-propyl) ether, ethyl(2,2,3,3-tetrafluoro-n-propyl) ether, ethyl (2,2,3,3,3-pentafluoro-n-propyl) ether, 2-fluoroethyl-n-propyl ether, (2-fluoroethyl) (3-fluoro-n-propyl) ether, (2-fluoroethyl) (3,3,3-trifluoro-n-propyl) ether, (2-fluoroethyl) (2,2,3,3-tetrafluoro-n-propyl) ether, (2-fluoroethyl) (2,2,3,3,3-pentafluoro-n-propyl) ether, 2,2,2-trifluoroethyl-n-propyl ether, (2,2,2-trifluoroethyl) (3-fluoro-n-propyl) ether, (2,2,2-trifluoroethyl) (3,3,3-trifluoro-n-propyl) ether, (2,2,2-trifluoroethyl) (2,2,3,3-tetrafluoro-n-propyl) ether, (2,2,2-trifluoroethyl) (2,2,3,3,3-pentafluoro-n-propyl) ether, 1,1,2,2-tetrafluoroethyl-n-propyl ether, (1,1,2,2-tetrafluoroethyl) (3-fluoro-n-propyl) ether, (1,1,2,2-tetrafluoroethyl) (3,3,3-trifluoro-n-propyl) ether, (1,1,2,2-tetrafluoroethyl) (2,2,3,3-tetrafluoro-n-propyl) ether, (1,1,2,2-tetrafluoroethyl) (2,2,3,3,3-pentafluoro-n-propyl) ether, di-n-propyl ether, (n-propyl) (3-fluoro-n-propyl) ether, (n-propyl) (3,3,3-trifluoro-n-propyl) ether, (n-propyl) (2,2,3,3-tetrafluoro-n-propyl) ether, (n-propyl) (2,2,3,3,3-pentafluoro-n-propyl) ether, di(3-fluoro-n-propyl) ether, (3-fluoro-n-propyl) (3,3,3-trifluoro-n-propyl) ether, (3-fluoro-n-propyl) (2,2,3,3-tetrafluoro-n-propyl) ether, (3-fluoro-n-propyl) (2,2,3,3,3-pentafluoro-n-propyl) ether, di(3,3,3-trifluoro-n-propyl) ether, (3,3,3-trifluoro-n-propyl) (2,2,3,3-tetrafluoro-n-propyl) ether, (3,3,3-trifluoro-n-propyl) (2,2,3,3,3-pentafluoro-n-propyl) ether, di(2,2,3,3-tetrafluoro-n-propyl) ether, (2,2,3,3-tetrafluoro-n-propyl) (2,2,3,3,3-pentafluoro-n-propyl) ether, di(2,2,3,3,3-pentafluoro-n-propyl) ether, di-n-butyl ether, dimethoxy methane, methoxy ethoxy methane, methoxy(2-fluoroethoxy)methane, methoxy(2,2,2-trifluoroethoxy)methane, methoxy(1,1,2,2-tetrafluoroethoxy)

methane, diethoxy methane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy) (2,2,2-trifluoroethoxy)methane, (2-fluoroethoxy) (1,1,2,2-tetrafluoroethoxy)methane, di(2,2,2-trifluoroethoxy)methane, (2,2,2-trifluoroethoxy) (1,1,2,2-tetrafluoroethoxy)methane, di(1,1,2,2-tetrafluoroethoxy) methane, dimethoxy ethane, methoxy ethoxy ethane, methoxy(2-fluoroethoxy)ethane, methoxy(2,2,2-trifluoroethoxy)ethane, methoxy(1,1,2,2-tetrafluoroethoxy)ethane, diethoxy ethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy) (2,2,2-trifluoroethoxy)ethane, (2-fluoroethoxy) (1,1,2,2-tetrafluoroethoxy)ethane, di(2,2,2-trifluoroethoxy)ethane, (2,2,2-trifluoroethoxy) (1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

Examples of the C3-C6 cyclic ether include tetrahydrofuran, 2-methyl tetrahydrofuran, 3-methyl tetrahydrofuran, 1,3-dioxane, 2-methyl-1,3-dioxane, 4-methyl-1,3-dioxane, and 1,4-dioxane, and fluorinated compounds thereof.

Preferred are dimethoxy methane, diethoxy methane, ethoxy methoxy methane, ethylene glycol di-n-propyl ether, ethylene glycol di-n-butyl ether, and diethylene glycol dimethyl ether because they have a high ability to solvate lithium ions and improve the ion dissociation. Particularly preferred are dimethoxy methane, diethoxy methane, and ethoxy methoxy methane because they have low viscosity and give high ion conductivity.

Ether compounds may be used alone or in combination of two or more at any ratio.

In general, the amount of the ether compound in 100% by volume of the nonaqueous solvent is preferably 5% by volume or more, more preferably 10% by volume or more, and still more preferably 15% by volume or more, whereas it is preferably 70% by volume or less, more preferably 60% by volume or less, and still more preferably 50% by volume or less.

The ether compound used in an amount within this range is likely to assure the effect of improving the ion conductivity owing to the improvement in degree of dissociation of lithium ions and a reduction in viscosity of the acyclic ether. The negative electrode active material which is a carbonaceous material may make it easy to avoid a reduction in capacity due to co-insertion of the acyclic ether with lithium ions.

The electrolytic solution of the present invention may further comprise an auxiliary agent in accordance with the purpose as appropriate.

Examples of the auxiliary agent include the following unsaturated cyclic carbonates having a fluorine atom, overcharge inhibitors, and other assistants.

(Unsaturated Cyclic Carbonate Having Fluorine Atom)

The unsaturated cyclic carbonate having a fluorine atom may also preferably be a cyclic carbonate having an unsaturated bond and a fluorine atom (hereinafter, also abbreviated as a "fluorinated unsaturated cyclic carbonate"). The number of fluorine atoms in the fluorinated unsaturated cyclic carbonate may be any number that is one or greater. The number of fluorine atoms is usually six or smaller, preferably four or smaller, and most preferably one or two.

Examples of the fluorinated unsaturated cyclic carbonate include fluorinated vinylene carbonate derivatives and fluorinated ethylene carbonate derivatives substituted with a substituent having an aromatic ring or a carbon-carbon double bond.

Examples of the fluorinated vinylene carbonate derivatives include 4-fluorovinylene carbonate, 4-fluoro-5-methyl vinylene carbonate, 4-fluoro-5-phenyl vinylene carbonate, 4-allyl-5-fluorovinylene carbonate, and 4-fluoro-5-vinyl vinylene carbonate.

Examples of the fluorinated ethylene carbonate derivatives substituted with a substituent having an aromatic ring or a carbon-carbon double bond include 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, 4,5-difluoro-4,5-diallyl ethylene carbonate, 4-fluoro-4-phenyl ethylene carbonate, 4-fluoro-5-phenyl ethylene carbonate, 4,4-difluoro-5-phenyl ethylene carbonate, and 4,5-difluoro-4-phenyl ethylene carbonate.

For combination use with the compound of the formula (1), the fluorinated unsaturated cyclic carbonate to be favorably used is preferably 4-fluorovinylene carbonate, 4-fluoro-5-methyl vinylene carbonate, 4-fluoro-5-vinyl vinylene carbonate, 4-allyl-5-fluorovinylene carbonate, 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, or 4,5-difluoro-4,5-diallyl ethylene carbonate because such a compound can form a stable interface-protecting film.

The fluorinated unsaturated cyclic carbonate may have any molecular weight that does not significantly deteriorate the effects of the present invention. The molecular weight is preferably 50 or higher and 250 or lower. The fluorinated unsaturated cyclic carbonate having a molecular weight within this range is likely to assure the solubility in the electrolytic solution and to exert the effects of the present invention.

The fluorinated unsaturated cyclic carbonate can be produced by any known production method. The molecular weight is more preferably 100 or higher and more preferably 200 or lower.

Fluorinated unsaturated cyclic carbonates may be used alone or in combination of two or more at any ratio. The fluorinated unsaturated cyclic carbonate may be used in any amount that does not significantly deteriorate the effects of the present invention. In general, the amount of the fluorinated unsaturated cyclic carbonate in 100% by mass of the electrolytic solution is preferably 0.01% by mass or more, more preferably 0.1% by mass or more, and still more preferably 0.2% by mass or more, whereas it is preferably 5% by mass or less, more preferably 4% by mass or less, and still more preferably 3% by mass or less. The fluorinated unsaturated cyclic carbonate in an amount within this range is likely to exert the effect of sufficiently improving the cycle characteristics of electrochemical devices comprising the electrolytic solution and to avoid a reduction in high-temperature storage characteristics, an increase in amount of gas generated, and a reduction in discharge capacity retention ratio.

(Overcharge Inhibitor)

The electrolytic solution of the present invention may comprise an overcharge inhibitor in order to effectively restrain bursting or ignition of a battery when an electrochemical device comprising the electrolytic solution is overcharged.

Examples of the overcharge inhibitor include aromatic compounds such as biphenyl, alkyl biphenyl, terphenyl, partially hydrogenated terphenyl, cyclohexyl benzene, t-butyl benzene, t-amyl benzene, diphenyl ether, and dibenzofuran; partially fluorinated aromatic compounds such as 2-fluorobiphenyl, o-cyclohexyl fluorobenzene, and p-cyclohexyl fluorobenzene; and fluoroanisole compounds such as 2,4-difluoroanisole, 2,5-difluoroanisole, 2,6-difluoroanisole, and 3,5-difluoroanisole. Preferred are aromatic compounds such as biphenyl, alkyl biphenyl, terphenyl, partially hydrogenated terphenyl, cyclohexyl benzene, t-butyl benzene, t-amyl benzene, diphenyl ether, and dibenzofuran. These compounds may be used alone or in combination of two or more. In the case of combination use of two or more compounds, preferred is a combination of cyclohexyl benzene and t-butyl benzene or t-amyl benzene, or a combination of at least one oxygen-free aromatic compound selected from biphenyl, alkyl biphenyl, terphenyl, partially hydrogenated terphenyl, cyclohexyl benzene, t-butyl benzene, t-amyl benzene, and the like, and at least one oxygen-containing aromatic compound selected from diphenyl ether, dibenzofuran, and the like for good balance between overcharge inhibiting characteristics and high-temperature storage characteristics.

(Assistant)

The electrolytic solution of the present invention can comprise any known assistant. Examples of the assistant include carbonate compounds such as erythritan carbonate, spiro-bis-dimethylene carbonate, and methoxy ethyl-methyl carbonate; carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; spiro compounds such as 2,4,8,10-tetraoxaspiro[5.5]undecane and 3,9-divinyl-2,4,8,10-tetraoxaspiro[5.5]undecane; sulfur-containing compounds such as ethylene sulfite, 1,3-propane sultone, 1-fluoro-1,3-propane sultone, 2-fluoro-1,3-propane sultone, 3-fluoro-1,3-propane sultone, 1-propene-1,3-sultone, 1-fluoro-1-propene-1,3-sultone, 2-fluoro-1-propene-1,3-sultone, 3-fluoro-1-propene-1,3-sultone, 1,4-butane sultone, 1-butene-1,4-sultone, 3-butene-1,4-sultone, methyl fluorosulfonate, ethyl fluorosulfonate, methyl methanesulfonate, ethyl methanesulfonate, busulfan, sulfolene, diphenyl sulfone, N,N-dimethyl methanesulfonamide, N,N-diethyl methanesulfonamide, methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate, and 1,2-bis(vinylsulfonyloxy)ethane; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; phosphorus-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, ethyl diethylphosphonoacetate, methyl dimethylphosphinate, ethyl diethylphosphinate, trimethylphosphine oxide, and triethylphosphine oxide; hydrocarbon compounds such as heptane, octane, nonane, decane, and cycloheptane; and fluoroaromatic compounds such as fluorobenzene, difluorobenzene, hexafluorobenzene, and benzotrifluoride. These compounds may be used alone or in combination of two or more. These assistants can improve the capacity retention characteristics and the cycle characteristics after high-temperature storage.

The assistant can be used in any amount that does not significantly deteriorate the effects of the present invention. The amount of the assistant in 100% by mass of the electrolytic solution is preferably 0.01% by mass or more and 5% by mass or less. The assistant used in an amount within this range can sufficiently exert the effects thereof and is likely to avoid the deterioration in battery characteristics such as high-load discharge characteristics. The amount of the assistant is more preferably 0.1% by mass or more, and still more preferably 0.2% by mass or more, whereas it is more preferably 3% by mass or less, and still more preferably 1% by mass or less.

The electrolytic solution of the present invention comprises an electrolyte salt (II).

The electrolyte salt (II) can be any electrolyte salt, and it is preferably a lithium salt.

Any lithium salt that is known to be usable for electrolytic solutions for batteries can be used. Specific examples thereof include the following.

Examples of the lithium salt include:

inorganic lithium salts such as $LiPF_6$, $LiBF_4$, $LiClO_4$, $LiAlF_4$, $LiSbF_6$, $LiTaF_6$, and $LiWF_7$;

lithium tungstates such as $LiWOF_5$;

lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

lithium sulfonates such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$;

lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, and $LiN(CF_3SO_2)(C_4F_9SO_2)$;

lithium methide salts such as $LiC(FSO_2)_3$, $LiC(CF_3SO_2)_3$, and $LiC(C_2F_5SO_2)_3$;

lithium oxalatoborates such as lithium difluorooxalatoborate and lithium bis(oxalato)borate;

lithium oxalatophosphates such as lithium tetrafluorooxalatophosphate, lithium difluorobis(oxalato)phosphate, and lithium tris(oxalato)phosphate; and fluoroorganic lithium salts such as $LiPF_4(CF_3)_2$, $LiPF_4(C_2F_5)_2$, $LiPF_4 (CF_3SO_2)_2$, $LiPF_4 (C_2F_5SO_2)_2$, $LiBF_3CF_3$, $LiBF_3C_2F_5$, $LiBF_3C_3F_7$, $LiBF_2 (CF_3)_2$, $LiBF_2 (C_2F_5)_2$, $LiBF_2 (CF_3SO_2)_2$, and $LiBF_2 (C_2F_5SO_2)_2$.

Particularly preferred are $LiPF_6$, $LiBF_4$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$ because they have an effect of improving the output characteristics, high rate charge and discharge characteristics, high-temperature storage characteristics, cycle characteristics, and other characteristics.

These lithium salts can be used alone or in combination of two or more. Preferable examples of a combination of two or more salts include a combination of $LiPF_6$ and $LiBF_4$ and a combination of $LiPF_6$ and $FSO_3Li$. Such combinations have an effect of improving the load characteristics and the cycle characteristics.

In this case, $LiBF_4$ or $FSO_3Li$ may be used at any concentration that does not significantly deteriorate the effects of the present invention in 100% by mass of the whole electrolytic solution. The concentration in the electrolytic solution of the present invention is usually 0.01% by mass or more, and preferably 0.1% by mass or more, whereas it is usually 30% by mass or less, and preferably 20% by mass or less.

Alternatively, an inorganic lithium salt and an organic lithium salt may be used in combination, for example. Combination use of these salts has an effect of restraining the deterioration during high-temperature storage. Preferable examples of the organic lithium salt include $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$. In this case, the proportion of the organic lithium salt in 100% by mass of the whole electrolytic solution is preferably 0.1% by mass or more, and particularly preferably 0.5% by mass or more, whereas it is preferably 30% by mass or less, and particularly preferably 20% by mass or less.

The concentration of the lithium salt in the electrolytic solution can be any value that does not deteriorate the effects of the present invention. In order to allow the electrolytic solution to have an electric conductivity within a favorable range and to assure good battery performance, the total mole concentration of lithium in the electrolytic solution is preferably 0.3 mol/L or higher, more preferably 0.4 mol/L or higher, and still more preferably 0.5 mol/L or higher, whereas it is preferably 3 mol/L or lower, more preferably 2.5 mol/L or lower, and still more preferably 2.0 mol/L or lower.

Too low a total mole concentration of lithium may cause insufficient electric conductivity of the electrolytic solution. Too high a total mole concentration thereof may increase the viscosity and thus deteriorate the electric conductivity, deteriorating the battery performance.

The electrolytic solution of the present invention can be produced by a known method, such as dissolving the compound represented by the formula (1) and the electrolyte salt (II) in the nonaqueous solvent (I).

Since the electrolytic solution of the present invention restrains gas generation and has stable battery characteristics, it is suitable as an electrolytic solution for electrochemical devices which are non-aqueous electrolytic batteries.

An electrochemical device comprising the electrolytic solution of the present invention is also one aspect of the present invention.

Examples of the electrochemical device include lithium ion secondary batteries, capacitors (electrolytic double-layer capacitors), radical batteries, solar cells (in particular, dye-sensitized solar cells), fuel cells, various electrochemical sensors, electrochromic elements, electrochemical switching elements, aluminum electrolytic capacitors, and tantalum electrolytic capacitors. Preferred are lithium ion secondary batteries and electrolytic double-layer capacitors, and particularly preferred are lithium ion secondary batteries.

A lithium ion secondary battery comprising the electrolytic solution of the present invention is also one aspect of the present invention.

The following will describe an electrochemical device comprising the electrolytic solution of the present invention.

The electrochemical device can have a known structure. It typically comprises negative and positive electrodes which can absorb and desorb ions (e.g., lithium ions), and the aforementioned electrolytic solution of the present invention.

<Negative Electrode>

First described is a negative electrode active material used for negative electrodes. The negative electrode active material may be any material which can electrochemically absorb and desorb lithium ions. Specific examples thereof include carbonaceous materials, alloyed materials, and lithium-containing metal complex oxide materials. These materials may be used alone or in combination of two or more.

(Negative Electrode Active Material)

Examples of the negative electrode active material include carbonaceous materials, alloyed materials, and lithium-containing metal complex oxide materials.

In order to achieve good balance of initial irreversible capacity and high-current-density charge and discharge characteristics, the carbonaceous material to be used as a negative electrode active material is preferably selected from:

(1) natural graphite;

(2) carbonaceous materials prepared by heat-treating an artificial carbonaceous substance or an artificial graphite substance at 400° C. to 3200° C. once or more;

(3) carbonaceous materials whose negative electrode active material layer comprises at least two carbonaceous substances having different crystalinities and/or has an interface at which the carbonaceous substances having different crystalinities are in contact with each other; and (4) carbonaceous materials whose negative electrode active material layer comprises at least two carbonaceous materials having different orientations and/or has an interface at which the carbonaceous substances having different orientations are in contact with each other. The carbonaceous materials (1) to (4) may be used alone or in combination of two or more at any ratio.

Examples of the artificial carbonaceous substances and the artificial graphite substances in the materials (2) include natural graphite, coal-based coke, petroleum-based coke, coal-based pitch, petroleum-based pitch, and those prepared by oxidizing these pitches; needle coke, pitch coke, and carbon materials prepared by partially graphitizing these cokes; pyrolysates of organic matter such as furnace black, acetylene black, and pitch-based carbon fibers; carbonizable organic matter and carbides thereof; and solutions prepared by dissolving carbonizable organic matter in a low-molecular-weight organic solvent such as benzene, toluene, xylene, quinoline, or n-hexane, and carbides thereof.

The alloyed material to be used as a negative electrode active material may be any compound that can absorb and desorb lithium, and examples thereof include simple lithium, simple metals and alloys that constitute lithium alloys, and oxides, carbides, nitrides, silicides, sulfides, and phosphides thereof. The simple metals and alloys constituting lithium alloys are preferably materials containing any of metal and semi-metal elements in the Groups 13 and 14 (i.e., excluding carbon), and more preferably simple metal of aluminum, silicon, and tin (hereinafter, also abbreviated as "specific metal elements"), and alloys and compounds containing any of these atoms. These materials may be used alone or in combination of two or more at any ratio.

Examples of the negative electrode active material having at least one atom selected from the specific metal elements include simple metal of any one specific metal element, alloys of two or more specific metal elements, alloys of one or two or more specific metal elements and one or two or more other metal elements, compounds containing one or two or more specific metal elements, and complex compounds such as oxides, carbides, nitrides, silicides, sulfides, and phosphides of the compounds. Use of such a simple metal, alloy, or metal compound as a negative electrode active material can give a high capacity to batteries.

Further, compounds can be used in which the above complex compounds are complexly bonded with several elements such as simple metals, alloys, and nonmetal elements. Specifically, in the case of silicon or tin, for example, an alloy of this element and a metal that does not serve as a negative electrode can be used. In the case of tin, for example, a complex compound comprising a combination of 5 or 6 elements including tin, a metal that serves as a negative electrode (excluding silicon), a metal that does not serve as a negative electrode, and a nonmetal element can be used.

In order to achieve a high capacity per unit mass of batteries, preferred among these negative electrode active materials are simple metals of the respective specific metal elements, alloys of two or more specific metal elements, and oxides, carbides, and nitrides of the specific metal elements. For a good capacity per unit mass and low environmental burden, simple metals of silicon and/or tin, alloys thereof, and oxides, carbides, and nitrides thereof are particularly preferred.

The lithium-containing metal complex oxide material to be used as a negative electrode active material can be any material that can absorb and desorb lithium. In order to achieve good high-current-density charge and discharge characteristics, materials containing titanium and lithium are preferred, lithium-containing composite metal oxide materials containing titanium are more preferred, and complex oxides of lithium and titanium (hereinafter, also abbreviated as "lithium titanium complex oxides") are still more preferred. In other words, use of a spinel-structured lithium titanium complex oxide contained in a negative electrode active material for electrochemical devices is particularly preferred because such a compound markedly reduces the output resistance.

Also preferred are lithium titanium complex oxides in which lithium or titanium is replaced by another metal element, for example at least one element selected from the group consisting of Na, K, Co, Al, Fe, Ti, Mg, Cr, Ga, Cu, Zn, and Nb.

In order to achieve a stable structure during doping and undoping of lithium ions, the metal oxide is preferably a lithium titanium complex oxide represented by the formula (D) wherein $0.7 \leq x \leq 1.5$, $1.5 \leq y \leq 2.3$, $0 \leq z \leq 1.6$.

$$Li_xTi_yM_zO_4 \quad (D)$$

In the formula (B), M represents at least one element selected from the group consisting of Na, K, Co, Al, Fe, Ti, Mg, Cr, Ga, Cu, Zn, and Nb.

Particularly preferred compositions represented by the formula (D) are those satisfying one of the following:
 (a) $1.2 \leq x \leq 1.4$, $1.5 \leq y \leq 1.7$, $z=0$
 (b) $0.9 \leq x \leq 1.1$, $1.9 \leq y \leq 2.1$, $z=0$
 (c) $0.7 \leq x \leq 0.9$, $2.1 \leq y \leq 2.3$, $z=0$ because these compositions give good balance of the battery performance.

Particularly preferred representative composition of the compound is $Li_{4/3}Ti_{5/3}O_4$ corresponding to the composition (a), $Li_1Ti_2O_4$ corresponding to the composition (b), and $Li_{4/5}Ti_{11/5}O_4$ corresponding to the composition (c).

Preferable examples of the structure satisfying $Z \neq 0$ include $Li_{4/3}Ti_{4/3}Al_{1/3}O_4$.

<Structure and Production Method of Negative Electrode>

The electrode can be produced by any known method that does not significantly deteriorate the effects of the present invention. For example, a binder (binding agent) and a solvent, and additives such as a thickening agent, a conductive material, and filler, if necessary, are added to the negative electrode active material to form slurry. This slurry is applied to a current collector, and then dried and pressed to provide an electrode.

With an alloyed material, a thin film layer containing the above negative electrode active material (negative electrode active material layer) can be produced by vapor deposition, sputtering, plating, or the like technique.

(Binding Agent)

The binder for binding the negative electrode active material can be any material stable to an electrolytic solution or a solvent to be used in production of the electrode.

Specific examples thereof include resin polymers such as polyethylene, polypropylene, polyethylene terephthalate, polymethyl methacrylate, aromatic polyamide, polyimide, cellulose, and nitro cellulose; rubbery polymers such as styrene-butadiene rubber (SBR), isoprene rubber, butadiene rubber, fluororubber, acrylonitrile-butadiene rubber (NBR), and ethylene-propylene rubber; styrene-butadiene-styrene block copolymers and hydrogenated products thereof; thermoplastic elastomeric polymers such as ethylene-propylene-diene terpolymers (EPDM), styrene-ethylene-butadiene-styrene copolymers, styrene-isoprene-styrene block copolymers, and hydrogenated products thereof; soft resin polymers such as syndiotactic-1,2-polybutadiene, polyvinyl acetate, ethylene-vinyl acetate copolymers, and propylene-α-olefin copolymers; fluoropolymers such as polyvinylidene fluoride, polytetrafluoroethylene, fluorinated polyvinylidene fluoride, and polytetrafluoroethylene-ethylene copolymers; and polymer compositions having ion conductivity of alkali metal ions (especially, lithium ions). These may be used alone or in combination of two or more at any ratio.

The proportion of the binder based on the negative electrode active material is preferably 0.1% by mass or more, more preferably 0.5% by mass or more, and particularly preferably 0.6% by mass or more. The proportion is also preferably 20% by mass or less, more preferably 15% by mass or less, still more preferably 10% by mass or less, and particularly preferably 8% by mass or less. If the proportion of the binder based on the negative electrode active material exceeds the above range, a large amount of the binder fails to contribute to the battery capacity, so that the battery capacity may decrease. If the proportion is lower than the above range, the negative electrode may have a lowered strength.

In particular, in the case of using a rubbery polymer typified by SBR as a main component, the proportion of the binder based on the negative electrode active material is usually 0.1% by mass or more, preferably 0.5% by mass or more, and more preferably 0.6% by mass or more, whereas the proportion thereof is usually 5% by mass or less, preferably 3% by mass or less, and more preferably 2% by mass or less. In the case of using a fluoropolymer typified by polyvinylidene fluoride as a main component, the proportion of the binder based on the negative electrode active material is usually 1% by mass or more, preferably 2% by mass or more, and more preferably 3% by mass or more, whereas the proportion thereof is usually 15% by mass or less, preferably 10% by mass or less, and more preferably 8% by mass or less.

(Slurry-Forming Solvent)

The solvent for forming slurry may be any solvent that can dissolve or disperse the negative electrode active material and the binder, and a thickening agent and a conductive material that are used as necessary. The slurry-forming solvent may be an aqueous solvent or an organic solvent.

Examples of the aqueous solvent include water and alcohols. Examples of the organic solvent include N-methylpyrrolidone (NMP), dimethyl formamide, dimethyl acetamide, methyl ethyl ketone, cyclohexanone, methyl acetate, methyl acrylate, diethyl triamine, N,N-dimethyl aminopropyl amine, tetrahydrofuran (THF), toluene, acetone, diethyl ether, dimethyl acetamide, hexamethyl phosphoramide, dimethyl sulfoxide, benzene, xylene, quinoline, pyridine, methyl naphthalene, and hexane.

Especially, in the case of an aqueous solvent, preferably, additives such as a dispersant are used in combination with a thickening agent and slurry is formed using latex such as SBR. These solvents may be used alone or in combination of two or more at any ratio.

(Current Collector)

The current collector for supporting the negative electrode active material can be any known one. Examples of the current collector for negative electrodes include metal materials such as aluminum, copper, nickel, stainless steel, and nickel-plated steel. Copper is preferred in terms of easy processability and cost.

For current collectors made of metal material, the form thereof may be, for example, a metal foil, a metal cylinder, a metal coil, a metal plate, a metal film, expanded metal, punched metal, or a metal foam. The form of the current collector is preferably a metal film, and more preferably a copper foil. It is still more preferably a rolled copper foil formed by a rolling technique or an electro-deposited copper foil formed by electrolysis. Both of these foils can be used as a current collector.

The current collector usually has a thickness of 1 μm or larger, and preferably 5 μm or larger. The thickness is also usually 100 μm or smaller, and preferably 50 μm or smaller. Too thick a negative electrode current collector may cause an excessive reduction in capacity of the whole battery, whereas too thin a current collector may be difficult to handle.

(Ratio Between Thicknesses of Current Collector and Negative Electrode Active Material Layer)

The ratio between the thicknesses of the current collector and the negative electrode active material layer may be any value, and the ratio "(thickness of negative electrode active material layer on one side immediately before injection of electrolytic solution)/(thickness of current collector)" is preferably 150 or lower, more preferably 20 or lower, and particularly preferably 10 or lower, whereas the ratio is preferably 0.1 or higher, more preferably 0.4 or higher, and particularly preferably 1 or higher. If the ratio between the thicknesses of the current collector and the negative electrode active material layer exceeds the above range, the current collector may generate heat due to Joule heating during high-current-density charging and discharging. If the ratio is below the above range, the ratio by volume of the current collector to the negative electrode active material is so high that the capacity of the battery may decrease.

<Positive Electrode>

(Positive Electrode Active Material)

The following will describe a positive electrode active material to be used for positive electrodes. The positive electrode active material used in the present invention is preferably a lithium transition metal compound powder that satisfies one of the following requirements and that has a function of inserting and extracting lithium ions.

1. Lithium transition metal compound powder with a pH of 10.8 or higher.

2. Lithium transition metal compound powder that comprises: a compound containing at least one element selected from the group consisting of Mo, W, Nb, Ta, and Re; and a compound containing one or both of B and Bi elements.

3. Lithium transition metal compound powder having a peak within the range of a pore radius of not smaller than 80 nm but smaller than 800 nm.

(Lithium Transition Metal Compound)

The lithium transition metal compound is a compound having a structure that enables extraction and insertion of Li ions, and examples thereof include sulfides, phosphate compounds, and lithium transition metal complex oxides. Examples of the sulfides include compounds having a 2D layered structure such as $TiS_2$ and $MoS_2$ and chevrel compounds having a firm 3D framework structure represented by the formula $Me_xMo_6S_8$ (wherein Me represents a transition metal typified by Pb, Ag, and Cu). Examples of the phosphate compound include those having an olivine structure generally represented by $LiMePO_4$ (wherein Me represents at least one transition metal). Specific examples thereof include $LiFePO_4$, $LiCoPO_4$, $LiNiPO_4$, and $LiMnPO_4$. Examples of the lithium transition metal complex oxide include those having a spinel structure which enable 3D diffusion and those having a layered structure which enable 2D diffusion of lithium ions. Those having a spinel structure are generally represented by $LiMe_2O_4$ (wherein Me represents at least one transition metal). Specific examples thereof include $LiMn_2O_4$, $LiCoMnO_4$, $LiNi_{0.5}Mn_{1.5}O_4$, and $LiCoVO_4$. Those having a layered structure are generally represented by $LiMeO_2$ (wherein Me represents at least one transition metal). Specific examples thereof include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, and $LiMnO_2$.

Preferred are lithium nickel manganese cobalt complex oxides and $LiCoO_2$.

In order to achieve good lithium ion diffusion, the lithium transition metal compound powder is preferably one having an olivine structure, a spinel structure, or a layered structure. Particularly preferred is one having a layered structure.

The lithium transition metal compound powder may further include any different element. Such a different element comprises at least one selected from the group consisting of B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, and I. These different elements may be incorporated into the crystal structure of the lithium nickel manganese cobalt complex oxide, or may not be incorporated into the crystal structure of the lithium nickel manganese cobalt complex oxide but be present unevenly as a simple substance or a compound on the surface of particles or the grain boundary.

(Additive)

The present invention may further use a compound (hereinafter, also referred to as an "additive 1") comprising at least one element selected from the group consisting of Mo, W, Nb, Ta, and Re (hereinafter, also referred to as an "additive element 1") and a compound (hereinafter, also referred to as an "additive 2") comprising at least one element selected from the group consisting of B and Bi (hereinafter, also referred to as an "additive element 2").

In order to achieve good effects, the additive element 1 is preferably Mo or W, and most preferably W. The additive element 2 is preferably B because it is available at low cost as an industrial material and it is a light element.

The compound (additive 1) comprising the additive element 1 can be in any form that allows the present invention to exert the effects thereof. It is usually an oxide.

Exemplary compounds of the additive 1 include MoO, $MoO_2$, $MoO_3$, $MoO_x$, $Mo_2O_3$, $Mo_2O_5$, $Li_2MoO_4$, WO, $WO_2$, $WO_3$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, NbO, $NbO_2$, $Nb_2O_3$, $Nb_2O_5$, $Nb_2O_5 \cdot nH_2O$, $LiNbO_3$, $Ta_2O$, $Ta_2O_5$, $LiTaO_3$, $ReO_2$, $ReO_3$, $Re_2O_3$, and $Re_2O_7$. For example, $MoO_3$, $Li_2MoO_4$, $WO_3$, and $Li_2WO_4$ are preferred, and $WO_3$ is particularly preferred, because they are relatively easily available industrial materials or they contain lithium. These additives 1 may be used alone or in combination of two or more.

The compound (additive 2) comprising the additive element 2 can be any compound that allows the present invention to exert the effects thereof. It is usually boric acid or a salt with an oxyacid, an oxide, or a hydroxide. Preferred among these additives 2 are boric acid and oxides because they are available at low cost as industrial materials, and particularly preferred is boric acid.

Exemplary compounds of the additive 2 include BO, $B_2O_2$, $B_2O_3$, $B_4O_5$, $B_6O$, $B_7O$, $B_{13}O_2$, $LiBO_2$, $LiB_5O_8$, $Li_2B_4O_7$, $HBO_2$, $H_3BO_3$, $B(OH)_3$, $B(OH)_4$, $BiBO_3$, $Bi_2O_3$, $Bi_2O_5$, and $Bi(OH)_3$. For example, $B_2O_3$, $H_3BO_3$, and $Bi_2O_3$ are preferred, and $H_3BO_3$ is particularly preferred, because they are easily available as industrial materials at relatively low cost. These additives 2 may be used alone or in combination of two or more.

The sum of the amounts of the additive 1 and the additive 2 based on the total mole of the transition metal elements constituting the main components is usually 0.1 mol % or more, preferably 0.3 mol % or more, more preferably 0.5 mol % or more, and particularly preferably 1.0 mol % or more, whereas it is usually less than 8 mol %, preferably 5 mol % or less, more preferably 4 mol % or less, and particularly preferably 3 mol % or less. Less than the lower limit of the sum of the amounts of the additives 1 and 2 may possibly fail to give the above effects, whereas more than the upper limit thereof may possibly deteriorate the battery performance.

(Production Method of Positive Electrode Active Material)

The positive electrode active material can be produced by any usual method of producing inorganic compounds. In particular, a spherical or ellipsoidal active material can be produced by various methods. For example, a material substance of transition metal is dissolved or crushed and dispersed in a solvent such as water, and the pH of the solution or dispersion is adjusted under stirring to form a spherical precursor. The precursor is recovered and, if necessary, dried. Then, a Li source such as LiOH, $Li_2CO_3$, or $LiNO_3$ is added thereto and the mixture is fired at high temperature, thereby providing an active material.

In order to produce a positive electrode, the aforementioned positive electrode active materials may be used alone or in any combination with one or more materials having a different composition at any ratio. Preferable examples of the combination in this case include combinations with $LiCoO_2$ and $LiMn_2O_4$ (e.g., $LiNi_{0.33}Co_{0.33}Mn_{0.33}O_2$) in which part of Mn may optionally be replaced by a different transition metal, and combinations with $LiCoO_2$ in which part of Co may optionally be replaced by a different transition metal.

(Production Method of Lithium Transition Metal Compound Powder)

The lithium transition metal compound powder can be produced by any non-specific method. For example, the powder is favorably produced by a method comprising: preparing slurry by pulverizing a lithium compound, a transition metal compound of at least one selected from Mn, Co, and Ni, and the aforementioned additives in a liquid medium and uniformly dispersing the components therein; spray-drying the resulting slurry; and firing the resulting spray-dried matter.

In the case of lithium nickel manganese cobalt complex oxide powder, for example, the powder can be produced by dispersing a lithium compound, a nickel compound, a manganese compound, a cobalt compound, and the additives in a liquid medium to prepare slurry, spray-drying the slurry, and firing the resulting spray-dried matter in an oxygen-containing gas atmosphere.

The following will describe the method of producing a lithium transition metal compound powder to be used in the present invention with reference to an exemplary method of producing a lithium nickel manganese cobalt complex oxide powder, which is one preferable embodiment of the present invention.

i) Slurry Preparation

With respect to the material compounds to be used in preparing slurry for production of the lithium transition metal compound powder, examples of the lithium compound include $Li_2CO_3$, $LiNO_3$, $LiNO_2$, LiOH, $LiOH \cdot H_2O$, LiH, LiF, LiCl, LiBr, LiI, $CH_3OOLi$, $Li_2O$, $Li_2SO_4$, Li dicarboxylates, Li citrate, fatty acid Li, and alkyl lithium. Preferred among these are lithium compounds free from nitrogen atoms, sulfur atoms, and halogen atoms because they generate no hazardous materials such as $SO_X$ and $NO_X$ during firing and make it easy to form voids in the secondary particles of the spray-dried powder by, for example, generating decomposing gas during firing. In consideration of these requirements, $Li_2CO_3$, LiOH, and $LiOH \cdot H_2O$ are preferred, and $Li_2CO_3$ is particularly preferred. These lithium compounds may be used alone or in combination of two or more.

Examples of the nickel compound include $Ni(OH)_2$, NiO, NiOOH, $NiCO_3$, $2NiCO_3 \cdot 3Ni(OH)_2 \cdot 4H_2O$, $NiC_2O_4 \cdot 2H_2O$, $Ni(NO_3)_2 \cdot 6H_2O$, $NiSO_4$, $NiSO_4 \cdot 6H_2O$, fatty acid nickel, and nickel halides. Preferred among these nickel compounds are $Ni(OH)_2$, NiO, NiOOH, $NiCO_3$, $2NiCO_3 \cdot 3Ni(OH)_2 \cdot 4H_2O$, and $NiC_2O_4 \cdot 2H_2O$ because they generate no hazardous materials such as $SO_X$ and $NO_X$ during firing. Also preferred are $Ni(OH)_2$, NiO, NiOOH, and $NiCO_3$ because they are available at low cost as industrial materials and have high reactivity. Particularly preferred are $Ni(OH)_2$, NiOOH, and $NiCO_3$ because they are likely to form voids in the secondary particles of the spray-dried powder by, for example, generating decomposing gas during firing. These nickel compounds may be used alone or in combination of two or more.

Examples of the manganese compound include manganese oxides such as $Mn_2O_3$, $MnO_2$, and $Mn_3O_4$, manganese salts such as $MnCO_3$, $Mn(NO_3)_2$, $MnSO_4$, manganese acetate, manganese dicarboxylates, manganese citrate, and fatty acid manganese, oxyhydroxides, and halides such as manganese chloride. Preferred among these manganese compounds are $MnO_2$, $Mn_2O_3$, $Mn_3O_4$, and $MnCO_3$ because they generate no gas such as $SO_X$ and $NO_X$ during firing, and are available at low cost as industrial materials. These manganese compounds may be used alone or in combination of two or more.

Examples of the cobalt compound include $Co(OH)_2$, CoOOH, CoO, $Co_2O_3$, $Co_3O_4$, $Co(OCOCH_3)_2 \cdot 4H_2O$, $CoCl_2$, $Co(NO_3)_2 \cdot 6H_2O$, $Co(SO_4)_2 \cdot 7H_2O$, and $CoCO_3$. Preferred are $Co(OH)_2$, CoOOH, CoO, $Co_2O_3$, $Co_3O_4$, and $CoCO_3$ because they generate no hazardous materials such as $SO_X$ and $NO_X$ during firing. Still more preferred are $Co(OH)_2$ and CoOOH because they are available industrially at low cost and have high reactivity. Particularly preferred are $Co(OH)_2$, CoOOH, and $CoCO_3$ because they are likely to form voids in the secondary particles of the spray-dried powder by, for example, generating decomposing gas during firing. These cobalt compounds may be used alone or in combination of two or more.

In addition to the above Li, Ni, Mn, and Co material compounds, any of the aforementioned different elements can be introduced by element substitution, or a group of compounds for efficient formation of voids in the secondary particles to be formed by spray-drying can be used together. Such compounds for efficient formation of voids in the secondary particles can be added before or after mixing the materials in accordance with the properties of the compounds. In particular, compounds which are easily decomposed by a mechanical shearing force during the mixing are preferably added after the mixing. The additives to be used in the present invention are as mentioned above.

The materials may be mixed by any method, such as wet mixing or dry mixing. Examples of the method include those using a device such as a ball mill, a vibrating mill, or a bead mill. Preferred is a wet mixing in which material compounds are mixed in a liquid medium such as water or an alcohol because the materials are more uniformly mixed and the mixture can have higher reactivity during the firing.

The mixing time depends on the mixing method. The mixing only needs to continue for a period of time that allows the materials to be uniformly mixed at the level of particles. For example, the mixing time with a ball mill (wet or dry) is usually about 1 hour to 2 days, and the residence time with a bead mill (wet continuous method) is usually 0.1 to 6 hours.

The mixing of the materials is preferably in parallel with pulverization of the materials. The index of the degree of pulverization is a particle size of pulverized material particles, and the average particle size (median size) used as an index is usually 0.6 µm or smaller, preferably 0.55 µm or smaller, still more preferably 0.52 µm or smaller, and most preferably 0.5 µm or smaller. Pulverized material particles having too large an average particle size may cause a reduction in reactivity during the firing, as well as difficulty in making the composition uniform. In contrast, pulverization of materials into particles smaller than necessary causes cost up. Thus, the materials only need to be pulverized into an average particle size of usually 0.01 µm or larger, preferably 0.02 µm or larger, and still more preferably 0.05 µm or larger. Such a degree of pulverization can be achieved by any method, but wet pulverization is preferred. Specific examples of the method include a method using DYNO-MILL.

The median size of the pulverized particles in slurry is measured using a known laser diffraction/scattering particle size distribution analyzer at a refractive index of 1.24, with the particle size reference being a volume reference. The dispersion medium used in the measurement is a 0.1% by weight aqueous solution of sodium hexametaphosphate. The measurement was performed after 5-minute ultrasonic dispersion (output: 30 W, frequency: 22.5 kHz).

ii) Spray-Drying

The wet mixing is usually followed by drying. Drying may be performed by any method, and spray-drying is preferred in order to achieve good uniformity, powder fluidity, and powder handling performance of particulate substances to be generated, and efficient production of dried particles.

(Spray-Dried Powder)

In the method of producing a lithium transition metal compound powder (e.g., a lithium nickel manganese cobalt complex oxide powder), the material compounds and the additives are wet-pulverized to form slurry and this slurry is spray-dried, so that a powder of secondary particles which result from coagulation of primary particles is obtained. The characteristics relating to the shape of the spray-dried powder consisting of the secondary particles resulting from the coagulation of primary particles can be confirmed by, for example, SEM observation or cross-sectional SEM observation.

iii) Firing

The spray-dried powder obtained in the above spray-drying is then subjected to firing as a firing precursor.

The firing conditions depend on the composition and the lithium compound material to be used. Still, when the firing temperature is too high, the primary particles tend to grow excessively, the sintering between particles tends to proceed excessively, and the specific surface area tends to be too small. In contrast, when a firing temperature is too low, a different phase may coexist, the crystal structure may not grow, and the lattice strain may increase. Further, the specific surface area may be too large. The firing temperature is usually 1000° C. or higher, preferably 1010° C. or higher, more preferably 1025° C. or higher, and still more preferably 1050° C. or higher, whereas it is preferably 1250° C. or lower, more preferably 1200° C. or lower, and still more preferably 1175° C. or lower.

The firing can be performed using a box furnace, a tube furnace, a tunnel furnace, or a rotary kiln, for example. The firing is usually divided into three sections, i.e., temperature-increasing, maximum-temperature-holding, and temperature-decreasing sections. The number of performing the second section of holding the maximum temperature may not necessarily be only one, and the second section may be performed twice or more according to need. The cycle consisting of temperature increase, maximum temperature holding, and temperature decrease may be repeated twice or more. Between the cycles may exist disintegration of coagulated secondary particles to the extent that the particles are not broken or pulverization of the particles into primary particles or much finer particles.

In the case of two-stage firing, the first stage is preferably maintained at a temperature which is not lower than the temperature where the Li material starts to decompose and not higher than the temperature where the material melts. For example, in the case of lithium carbonate, the holding temperature in the first stage is preferably 400° C. or higher, more preferably 450° C. or higher, still more preferably 500° C. or higher, and most preferably 550° C. or higher, whereas the holding temperature is usually 950° C. or lower, more preferably 900° C. or lower, still more preferably 880° C. or lower, and most preferably 850° C. or lower.

The temperature-increasing section toward the maximum-temperature-holding section usually increases the temperature in a furnace at a temperature-increasing rate of 1° C./min or higher and 15° C./min or lower. Too low a temperature-increasing rate takes much time, and thus is industrially disadvantageous, but too high a rate may fail to allow the furnace temperature to follow the set temperature. The temperature-increasing rate is preferably 2° C./min or higher, and more preferably 3° C./min or higher, whereas the rate is preferably 20° C./min or lower, and more preferably 18° C./min or lower.

The holding time in the maximum-temperature-holding section depends on the temperature. Still, within the above temperature range, the holding time is usually 15 minutes or longer, preferably 30 minutes or longer, still more preferably 45 minutes or longer, and most preferably 1 hour or longer, whereas the holding time is usually 24 hours or shorter, preferably 12 hours or shorter, still more preferably 9 hours or shorter, and most preferably 6 hours or shorter. Too short a firing time makes it difficult to form a lithium transition metal compound powder with good crystallinity, whereas too long a firing time is impractical. Too long a firing time is disadvantageous because the process requires post-disintegration or has difficulty in disintegration.

The temperature-decreasing section usually decreases the temperature in a furnace at a temperature-decreasing rate of 0.1° C./min or higher and 15° C./min or lower. Too low a temperature-decreasing rate takes a long time so that it is industrially disadvantageous, whereas too high a temperature-decreasing rate also tends to give poor uniformity of the target product or to accelerate the deterioration of a container. The temperature-decreasing rate is preferably 1° C./min or higher, and more preferably 3° C./min or higher, whereas it is preferably 20° C./min or lower, and more preferably 15° C./min or lower.

The firing atmosphere is an appropriate gas atmosphere that satisfies an oxygen partial pressure range appropriate for the composition of the target lithium transition metal compound powder. Examples of the gas include oxygen, air, nitrogen, argon, hydrogen, carbon dioxide, and gas mixtures thereof. For the lithium nickel manganese cobalt complex oxide powder specifically exemplified in the present invention, oxygen-containing gas atmosphere such as air can be used. The oxygen concentration is usually 1% by volume or more, preferably 10% by volume or more, and more preferably 15% by volume or more, whereas it is usually 100% by volume or less, preferably 50% by volume or less, and more preferably 25% by volume or less.

In production of a lithium transition metal compound powder (e.g., a lithium nickel manganese cobalt complex oxide powder having the above specific composition) by such a production method under certain producing conditions, the ratio by mole of Li/Ni/Mn/Co can be adjusted to the target value by adjusting the ratio of mixing the respective compounds when a lithium compound, a nickel compound, a manganese compound, and a cobalt compound, and the additives in the present invention are dispersed in a liquid medium to prepare slurry.

The lithium transition metal compound powder such as a lithium nickel manganese cobalt complex oxide powder produced as mentioned above can provide a positive electrode material for lithium secondary batteries having good balance of performance, such as high capacity, low-temperature output characteristics, and excellent storage characteristics.

<Structure and Production Method of Positive Electrode>

The following will describe the structure of a positive electrode. The positive electrode in the present invention can be produced by forming, on a current collector, a positive electrode active material layer containing a positive electrode active material and a binding agent. The positive electrode comprising a positive electrode active material can be produced by a usual method. Specifically, a positive electrode active material and a binding agent, and if necessary other components such as a conductive material and a thickening agent are dry-mixed and formed into a sheet-shaped article, and this sheet is compression-bonded to a positive electrode current collector, or these materials are dissolved or dispersed in a liquid medium to prepare slurry, and this slurry is applied to a positive electrode current collector, and then dried so that a positive electrode active material layer is formed on the current collector. Thereby, a positive electrode can be produced.

The amount of the positive electrode active material in the positive electrode active material layer is preferably 80% by mass or more, more preferably 82% by mass or more, and particularly preferably 84% by mass or more. The upper limit thereof is preferably 99% by mass or less, and more preferably 98% by mass or less. Too small an amount of the positive electrode active material in the positive electrode active material layer may lead to an insufficient electric capacity. In contrast, too large an amount thereof may lead to an insufficient strength of the resulting positive electrode.

(Binding Agent)

The binding agent to be used in production of the positive electrode active material layer may be any binding agent. In the case of an application method, the binding agent only needs to be a material that can be dissolved or dispersed in a liquid medium to be used in production of the electrode. Specific examples thereof include the same binding agents mentioned above in the production of the negative electrode. These materials can be used alone or in combination of two or more at any ratio.

The proportion of the binding agent in the positive electrode active material layer is usually 0.1% by mass or more, preferably 1% by mass or more, and more preferably 1.5% by mass or more. The upper limit of the proportion is usually 80% by mass or less, preferably 60% by mass or less, still more preferably 40% by mass or less, and most preferably 10% by mass or less. Too low a proportion of the binding agent may fail to sufficiently hold the positive electrode active material so that the resulting positive electrode may have an insufficient mechanical strength, resulting in deteriorated battery performance such as cycle characteristics. In contrast, too high a proportion thereof may lead to a reduction in battery capacity and conductivity.

(Slurry-Forming Solvent)

The solvent for forming slurry may be any solvent that can dissolve or disperse therein the positive electrode active material, the conductive material, and the binding agent, and a thickening agent used if necessary. The solvent may be either of an aqueous solvent or an organic solvent. Examples of the aqueous medium include water and solvent mixtures of an alcohol and water. Examples of the organic medium include aliphatic hydrocarbons such as hexane; aromatic hydrocarbons such as benzene, toluene, xylene, and methyl naphthalene; heterocycle compounds such as quinoline and pyridine; ketones such as acetone, methyl ethyl ketone, and cyclohexanone; esters such as methyl acetate and methyl acrylate; amines such as diethylene triamine and N,N-dimethylaminopropylamine; ethers such as diethyl ether, propylene oxide, and tetrahydrofuran (THF); amides such as N-methylpyrrolidone (NMP), dimethyl formamide, and dimethyl acetamide; and aprotic polar solvents such as hexamethyl phosphoramide and dimethyl sulfoxide.

(Current Collector)

The positive electrode current collector may be formed from any known material. Specific examples thereof include metal materials such as aluminum, stainless steel, nickel-plated material, titanium, and tantalum; and carbon materials such as carbon cloth and carbon paper. Preferred are metal materials, especially aluminum.

In the case of a metal material, the current collector may be in the form of metal foil, metal cylinder, metal coil, metal plate, metal film, expanded metal, punched metal, metal foam, or the like. In the case of a carbon material, it may be in the form of carbon plate, carbon film, carbon cylinder, or the like.

In order to reduce the electric contact resistance between the current collector and the positive electrode active material layer, the current collector also preferably has a conductive auxiliary agent applied on the surface thereof. Examples of the conductive auxiliary agent include carbon and noble metals such as gold, platinum, and silver.

The ratio between the thicknesses of the current collector and the positive electrode active material layer may be any value, and the ratio {(thickness of positive electrode active material layer on one side immediately before injection of electrolytic solution)/(thickness of current collector)} is preferably 20 or lower, more preferably 15 or lower, and most preferably 10 or lower. The lower limit of the ratio is preferably 0.5 or higher, more preferably 0.8 or higher, and most preferably 1 or higher. If the ratio exceeds the above range, the current collector may generate heat due to Joule heating during high-current-density charging and discharging. If the ratio is below the above range, the ratio by volume of the current collector to the positive electrode active material is so high that the capacity of the battery may decrease.

<Separator>

In order to prevent short circuits, a separator is usually disposed between the positive electrode and the negative electrode. In this case, the electrolytic solution of the present invention is usually impregnated into this separator.

The separator may be formed from any material and may have any shape. The material and the shape thereof can be any known ones that do not significantly deteriorate the effects of the present invention. The separator is preferably in the form of a porous sheet or a nonwoven fabric which is formed from a material stable to the electrolytic solution of the present invention, such as resin, glass fiber, or inorganic matter, and which is excellent in liquid retention.

Examples of the material of a resin or glass-fiber separator include polyolefins such as polyethylene and polypropylene, aromatic polyamide, polytetrafluoroethylene, polyether sulfone, and glass filters. Preferred are glass filters and polyolefins, and more preferred are polyolefins. These materials may be used alone or in combination of two or more at any ratio.

The separator may have any thickness, and the thickness is usually 1 μm or larger, preferably 5 μm or larger, and more preferably 8 μm or larger, whereas it is usually 50 μm or smaller, preferably 40 μm or smaller, and more preferably 30 μm or smaller. A separator thinner than the above range may have reduced insulation and mechanical strength. A separator thicker than the above range may not only have deteriorated battery performance, such as rate characteristics, but also lead to a reduced energy density of the whole electrochemical device.

When the separator is a porous one such as a porous sheet or a nonwoven fabric, the separator may have any porosity. The porosity is usually 20% or higher, preferably 35% or higher, and more preferably 45% or higher, whereas it is usually 90% or lower, preferably 85% or lower, and more preferably 75% or lower. A porosity lower than the above range tends to cause an increase in film resistance, deteriorating the rate characteristics. A porosity higher than the above range tends to cause a decrease in mechanical strength of the separator, deteriorating the insulation.

The separator may also have any average pore size. The average pore size is usually 0.5 μm or smaller, and preferably 0.2 μm or smaller, whereas the average pore size is usually 0.05 μm or larger. The separator having an average pore size exceeding the above range may easily cause short circuits. The separator having an average pore size lower than the above range may have a high film resistance, deteriorating the rate characteristics.

Examples of the inorganic material include oxides such as alumina and silicon dioxide, nitrides such as aluminum nitride and silicon nitride, and sulfates such as barium sulfate and calcium sulfate. The inorganic material is in the form of particles or fibers.

The separator is in the form of a thin film such as a nonwoven fabric, a woven fabric, or a microporous film. The thin film favorably has a pore diameter of 0.01 to 1 μm and a thickness of 5 to 50 μm. In addition to the form of the above separate thin film, the separator may have a structure in which a complex porous layer containing particles of the above inorganic material is formed on the surface of one or both of the positive and negative electrodes using a resin binding agent. For example, alumina particles having a 90% particle size of smaller than 1 μm is applied to the respective surfaces of the positive electrode with fluororesin used as a binding agent to form a porous layer.

The following will describe a battery design.

<Electrode Group>

The electrode group may be either a laminated structure comprising the above positive electrode plate and negative electrode plate with the above separator interposed therebetween, or a wound structure comprising the above positive electrode plate and negative electrode plate in spiral with the above separator interposed therebetween. The proportion of the volume of the electrode group in the battery internal volume (hereinafter, referred to as an electrode group proportion) is usually 40% or higher, and preferably 50% or higher, whereas it is usually 90% or lower, and preferably 80% or lower.

An electrode group proportion lower than the above range may lead to a low battery capacity. If the electrode group proportion exceeds the above range, the battery has small space for voids. Thus, when the battery temperature rises to high temperature, the components may swell or the liquid fraction of the electrolytic solution shows a high vapor pressure, so that the internal pressure rises. This may result in the deterioration in battery characteristics such as repeated charge and discharge performance and high-temperature storageability, causing a gas-releasing valve for releasing the internal pressure toward the outside to work.

<Current Collecting Structure>

The current collecting structure may be any structure. In order to more effectively improve the high-current-density charge and discharge characteristics by the electrolytic solution of the present invention, the current collecting structure is preferably a structure which reduces the resistances at wiring portions and jointing portions. When the internal resistance is reduced in such a manner, the effects of using the electrolytic solution of the present invention can particularly favorably be achieved.

In an electrode group having the layered structure, the metal core portions of the respective electrode layers are preferably bundled and welded to a terminal. If an electrode has a large area, the internal resistance is high. Thus, multiple terminals may preferably be formed in the electrode to reduce the resistance. In an electrode group having the wound structure, multiple lead structures may be disposed on each of the positive electrode and the negative electrode and bundled to a terminal. Thereby, the internal resistance can be reduced.

<External Case>

The external case may be made of any material that is stable to an electrolytic solution to be used. Specific examples thereof include metals such as nickel-plated steel plates, stainless steel, aluminum and aluminum alloys, and magnesium alloys, and layered film (laminate film) of resin and aluminum foil. In order to reduce the weight, metals such as aluminum and aluminum alloys and laminate films are favorably used.

External cases made of metal may have a sealed up structure formed by welding the metal by laser welding, resistance welding, or ultrasonic welding or a caulking structure using the metal via a resin gasket. External cases made of a laminate film may have a sealed up structure formed by hot melting the resin layers. In order to improve the sealability, a resin which is different from the resin of the laminate film may be disposed between the resin layers. Especially, in the case of forming a sealed up structure by heat melting the resin layers via current collecting terminals, metal and resin are to be bonded. Thus, the resin to be disposed between the resin layers is favorably a resin having a polar group or a modified resin having a polar group introduced thereinto.

<Protective Element>

A protective element may be used such as a positive temperature coefficient (PTC) which increases the resistance when abnormal generation of heat or overcurrent is observed, a thermal fuse, a thermistor, or a valve (current-cutoff valve) that cuts off a current passing through the circuit when the internal pressure or internal temperature in the battery suddenly rises due to abnormal generation of heat. The protective element is preferably one that does not work under normal conditions at high current. More preferably, a battery is designed so as not to reach abnormal generation of heat or thermal runaway even without any protective element.

<External Housing>

The electrochemical device of the present invention usually comprises an external housing that accommodates the electrolytic solution, the negative electrode, the positive electrode, the separator, and other components. This external housing may be any known housing that does not significantly deteriorate the effects of the present invention. Specifically, the external housing may be made of any material. The material is usually nickel-plated iron, stainless steel, aluminum or its alloy, nickel, titanium, or the like.

The external housing may have any shape, and may be in the form of a cylinder, a square, a laminate, a coin, or a large-size shape.

A module comprising the lithium ion secondary battery of the present invention is also one aspect of the present invention.

As mentioned hereinabove, the electrolytic solution of the present invention restrains gas generation and is excellent in battery characteristics. Thus, the electrolytic solution is particularly useful for electrochemical devices such as large-size lithium ion secondary batteries for hybrid cars and distributed power source systems, and also useful for electrochemical devices such as small-size lithium ion secondary batteries.

EXAMPLES

The present invention will be described referring to, but not limited to, examples and comparative examples.

Production of Electrolytic Solution

Examples 1 to 8, Comparative Examples 1 to 5

Ethyl methyl carbonate (EMC) and ethylene carbonate (EC) were mixed at a ratio by volume of 70:30 under dry argon atmosphere to prepare a solution. Dried $LiPF_6$ was dissolved in this solution so as to be a concentration of 1 mol/L, so that a base electrolytic solution was prepared. To this base electrolytic solution was added the compound shown in Table 1 at a proportion shown in Table 1. Thereby, electrolytic solutions to be used in Examples 1 to 8 and Comparative Examples 1 to 5 were produced.

Examples 9 to 16, Comparative Examples 6 to 10

Ethyl methyl carbonate (EMC), ethylene carbonate (EC), and fluoroethylene carbonate (FEC) were mixed at a ratio by volume of 70:20:10 under dry argon atmosphere to prepare a solution. Dried $LiPF_6$ was dissolved in this solution so as to be a concentration of 1 mol/L, so that a base electrolytic solution was prepared. To this base electrolytic solution was added the compound shown in Table 2 at a proportion shown in Table 2. Thereby, electrolytic solutions to be used in Examples 9 to 16 and Comparative Examples 6 to 10 were produced.

Examples 17 to 21, Comparative Examples 11 to 13

Ethyl methyl carbonate (EMC), ethylene carbonate (EC), and fluoroethylene carbonate (FEC) were mixed at a ratio by volume of 70:20:10 under dry argon atmosphere to prepare a solution. Dried $LiPF_6$ was dissolved in this solution so as to be a concentration of 1 mol/L, and then 2% by mass of vinylene carbonate (VC) was mixed therewith, so that a base electrolytic solution was prepared. To this base electrolytic solution was added the compound shown in Table 3 at a proportion shown in Table 3. Thereby, electrolytic solutions to be used in Examples 17 to 21 and Comparative Examples 11 to 13 were produced.

The compounds corresponding to the components (I-a) and (I-d) shown in Tables 1 to 3 are as follows.

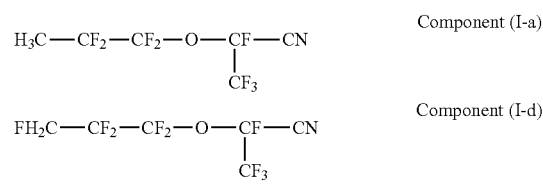

With the resulting electrolytic solutions, secondary batteries were produced and the high-temperature storage characteristics of the secondary batteries were evaluated as follows. The evaluation results are shown in Tables 1 to 3.

(Production of Negative Electrode)

Artificial graphite powder as a negative electrode active material, an aqueous dispersion of sodium carboxylmethyl cellulose (concentration of sodium carboxymethyl cellulose: 1% by mass) as a thickening agent, and an aqueous dispersion of styrene-butadiene rubber (concentration of styrene-butadiene rubber: 50% by mass) as a binding agent were mixed in a water solvent at a ratio of 97.6/1.2/1.2 (% by mass) to form slurry. This slurry was used as a negative electrode mixture slurry. The slurry was uniformly applied to a 20-μm-thick copper foil and dried, and then the dried workpiece was compressed with a press. Thereby, a negative electrode was produced.
(Production of Positive Electrode)
LiCoO$_2$ as a positive electrode active material, an acetylene black as a conductive material, and polyvinylidene fluoride (PVdF) as a binding agent were mixed at a ratio of 95/3/2 (% by mass) to provide a positive electrode material. This positive electrode material was dispersed in N-methyl-2-pyrrolidone to form slurry. This slurry was used as a positive electrode mixture slurry. The resulting positive electrode mixture slurry was uniformly applied to a 21-μm-thick aluminum foil current collector, and then dried to provide a positive electrode mixture layer. Thereafter, the workpiece was compressed with a press. Thereby, a positive electrode was produced.
(Production of Secondary Battery)
The negative electrode and the positive electrode each produced as mentioned above and a polyethylene separator were stacked in the order of negative electrode, separator, and positive electrode. Thereby, a battery element was produced.
This battery element was put into a package made of a laminate film comprising an aluminum sheet (thickness: 40 μm) and resin layers covering the respective surfaces of the sheet such that the terminals of the positive electrode and the negative electrode protruded from the package. Then, the corresponding electrolytic solution in Examples 1 to 21 and Comparative Examples 1 to 13 was put into the package, and the package was vacuum-sealed. Thereby, a sheet-like lithium ion secondary battery was produced.
<Evaluation Test of High-Temperature Storage Characteristics>
The secondary battery produced above was sandwiched and pressurized between plates. The secondary battery in this state was subjected to constant current/constant voltage charging (hereinafter, referred to as CC/CV charging) up to 4.2 V with a current corresponding to 0.2 C at 25° C. (cut-off current: 0.1 C). Then, the battery was discharged down to 3 V with a constant current of 0.2 C. This process was defined as one cycle, and the initial discharge capacity was determined from the discharge capacity in the third cycle. Here, "1 C" represents a current value required for discharging the reference capacity of the battery over one hour. For example, 0.2 C represents a current value that is ⅕ of 1 C. The battery was again subjected to the CC/CV charging up to 4.2 V (cut-0.15 off current: 0.1 C) and stored at high temperature. In Examples 1 to 8 and Comparative Examples 1 to 5, the battery was stored at 85° C. for three days, and in Examples 9 to 21 and Comparative Examples 6 to 13, the battery was stored at 85° C. for one day. The battery was sufficiently cooled down, and then the volume thereof was determined by the Archimedes' principle. Based on the change in volume before and after the storage, the amount of gas generated was determined. Next, the battery was discharged down to 3 V with a current of 0.2 C at 25° C., and the capacity remaining after high-temperature storage was measured. Then, the proportion of the remaining capacity to the initial discharge capacity was determined. This value was defined as the storage capacity retention ratio (%).

(Remaining capacity)/(initial discharge capacity)× 100=storage capacity retention ratio (%)

Production of Electrolytic Solution

Examples 22 to 30, Comparative Examples 14 to 18

Ethyl methyl carbonate (EMC) and ethylene carbonate (EC) were mixed at a ratio by volume of 70:30 under dry argon atmosphere to prepare a solution. Dried LiPF$_6$ was dissolved in this solution so as to be a concentration of 1 mol/L, so that a base electrolytic solution was prepared. To this base electrolytic solution was added the compound shown in Table 4 at a proportion shown in Table 4. Thereby, electrolytic solutions to be used in Examples 22 to 30 and Comparative Examples 14 to 18 were produced.

Examples 31 to 39, Comparative Examples 19 to 23

Ethyl methyl carbonate (EMC), ethylene carbonate (EC), and fluoroethylene carbonate (FEC) were mixed at a ratio by volume of 70:20:10 under dry argon atmosphere to prepare a solution. Dried LiPF$_6$ was dissolved in this solution so as to be a concentration of 1 mol/L, so that a base electrolytic solution was prepared. To this base electrolytic solution was added the compound shown in Table 5 at a proportion shown in Table 5. Thereby, electrolytic solutions to be used in Examples 31 to 39 and Comparative Examples 19 to 23 were produced.

Examples 40 to 45, Comparative Examples 24 to 26

Ethyl methyl carbonate (EMC), ethylene carbonate (EC), and fluoroethylene carbonate (FEC) were mixed at a ratio by volume of 70:20:10 under dry argon atmosphere to prepare a solution. Dried LiPF$_6$ was dissolved in this solution so as to be a concentration of 1 mol/L, and then 2% by mass of vinylene carbonate (VC) was mixed therewith, so that a base electrolytic solution was prepared. To this base electrolytic solution was added the compound shown in Table 6 at a proportion shown in Table 6. Thereby, electrolytic solutions to be used in Examples 40 to 45 and Comparative Examples 24 to 26 were produced.

The compounds corresponding to the components (I-b), (I-c), and (I-e) shown in Tables 4 to 6 are as follows.

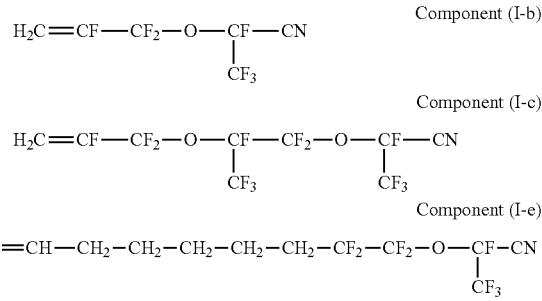

With the resulting electrolytic solutions, secondary batteries were produced and the high-temperature storage characteristics of the secondary batteries were evaluated as follows. The evaluation results are shown in Tables 4 to 6.
(Production of Negative Electrode)
Artificial graphite powder as a negative electrode active material, an aqueous dispersion of sodium carboxylmethyl cellulose (concentration of sodium carboxymethyl cellulose: 1% by mass) as a thickening agent, and an aqueous dispersion of styrene-butadiene rubber (concentration of styrene-butadiene rubber: 50% by mass) as a binding agent were mixed in a water solvent at a ratio of 97.6/1.2/1.2 (% by mass) to form slurry. This slurry was used as a negative electrode mixture slurry. The slurry was uniformly applied to a 20-μm-thick copper foil and dried, and then the dried workpiece was compressed with a press. Thereby, a negative electrode was produced.

(Production of Positive Electrode)

$LiNi_{1/3}Mn_{1/3}Co_{1/3}O_2$ as a positive electrode active material, an acetylene black as a conductive material, and polyvinylidene fluoride (PVdF) as a binding agent were mixed at a ratio of 92/3/5 (% by mass) to provide a positive electrode material. This positive electrode material was dispersed in N-methyl-2-pyrrolidone to form slurry. This slurry was used as a positive electrode mixture slurry. The resulting positive electrode mixture slurry was uniformly applied to a 21-μm-thick aluminum foil current collector, and then dried to provide a positive electrode mixture layer. Thereafter, the workpiece was compressed with a press. Thereby, a positive electrode was produced.

(Production of Secondary Battery)

The negative electrode and the positive electrode each produced as mentioned above and a polyethylene separator were stacked in the order of negative electrode, separator, and positive electrode. Thereby, a battery element was produced.

This battery element was put into a package made of a laminate film comprising an aluminum sheet (thickness: 40 μm) and resin layers covering the respective surfaces of the sheet such that the terminals of the positive electrode and the negative electrode protruded from the package. Then, the corresponding electrolytic solution in Examples 22 to 45 and Comparative Examples 14 to 26 was put into the package, and the package was vacuum-sealed. Thereby, a sheet-like lithium ion secondary battery was produced.

<Evaluation Test of High-Temperature Storage Characteristics>

The secondary battery produced above was sandwiched and pressurized between plates. The secondary battery in this state was subjected to constant current/constant voltage charging (hereinafter, referred to as CC/CV charging) up to 4.2 V with a current corresponding to 0.2 C at 25° C. (cut-off current: 0.1 C). Then, the battery was discharged down to 3 V with a constant current of 0.2 C. This process was defined as one cycle, and the initial discharge capacity was determined from the discharge capacity in the third cycle. Here, "1 C" represents a current value required for discharging the reference capacity of the battery over one hour. For example, 0.2 C represents a current value that is ⅕ of 1 C. The battery was again subjected to the CC/CV charging up to 4.2 V (cut-off current: 0.1 C) and stored at high temperature. In Examples 22 to 30 and Comparative Examples 14 to 18, the battery was stored at 85° C. for three days, and in Examples 31 to 45 and Comparative Examples 19 to 26, the battery was stored at 85° C. for one day. The battery was sufficiently cooled down, and then the volume thereof was determined by the Archimedes' principle. Based on the change in volume before and after the storage, the amount of gas generated was determined. Next, the battery was discharged down to 3 V with a current of 0.2 C at 25° C., and the capacity remaining after high-temperature storage was measured. Then, the proportion of the remaining capacity to the initial discharge capacity was determined. This value was defined as the storage capacity retention ratio (%).

(Remaining capacity)/(initial discharge capacity)× 100=storage capacity retention ratio (%)

TABLE 1

| | Compound mixed to base electrolytic solution | | Storage capacity retention ratio (%) |
|---|---|---|---|
| | Structure | Mixing proportion (mass %) | Amount of gas (mL) | |

| | Structure | Mixing proportion (mass %) | Amount of gas (mL) | Storage capacity retention ratio (%) |
|---|---|---|---|---|
| Example 1 | Component (I-a) | 0.001 | 0.16 | 92 |
| Example 2 | | 0.01 | 0.13 | 93 |
| Example 3 | | 0.1 | 0.08 | 94 |
| Example 4 | | 0.5 | 0.06 | 95 |
| Example 5 | | 6 | 0.10 | 94 |
| Example 6 | | 8 | 0.12 | 93 |
| Example 7 | | 20 | 0.17 | 91 |
| Example 8 | Component (I-d) | 0.5 | 0.08 | 94 |
| Comparative Example 1 | — | — | 0.20 | 90 |
| Comparative Example 2 | Component (I-a) | 30 | 0.19 | 89 |
| Comparative Example 3 | Component (I-a) | 50 | (*) — | (*) — |
| Comparative Example 4 | $CF_3CF_2CF_2CF_2CF_2CN$ | 0.5 | 0.18 | 89 |
| Comparative Example 5 | $CF_3CF_2CF_2OCF(CF_3)CN$ | 0.5 | 0.18 | 89 |

(*) Part of 50% by mass of the component (I-a) was phase-separated from the base electrolytic solution, which prevented the evaluation of battery characteristics.

TABLE 2

| | Structure | Mixing proportion (mass %) | Amount of gas (mL) | Storage capacity retention ratio (%) |
|---|---|---|---|---|
| Example 9 | Component (I-a) | 0.001 | 0.19 | 93 |
| Example 10 | | 0.01 | 0.16 | 94 |
| Example 11 | | 0.1 | 0.12 | 95 |
| Example 12 | | 0.5 | 0.10 | 96 |
| Example 13 | | 6 | 0.12 | 95 |
| Example 14 | | 8 | 0.15 | 94 |
| Example 15 | | 20 | 0.20 | 93 |
| Example 16 | Component (I-d) | 0.5 | 0.12 | 94 |
| Comparative Example 6 | — | — | 0.25 | 92 |
| Comparative Example 7 | Component (I-a) | 30 | 0.24 | 91 |
| Comparative Example 8 | Component (I-a) | 50 | (*) — | (*) — |
| Comparative Example 9 | $CF_3CF_2CF_2CF_2CF_2CN$ | 0.5 | 0.22 | 91 |
| Comparative Example 10 | $CF_3CF_2CF_2OCF(CF_3)CN$ | 0.5 | 0.22 | 91 |

(*) Part of 50% by mass of the component (I-a) was phase-separated from the base electrolytic solution, which prevented the evaluation of battery characteristics.

TABLE 3

| | Compound mixed to base electrolytic solution | | | Storage |
|---|---|---|---|---|
| | Structure | Mixing proportion (mass %) | Amount of gas (mL) | capacity retention ratio (%) |
| Example 17 | Component (I-a) | 0.1 | 0.41 | 95 |
| Example 18 | | 0.5 | 0.39 | 97 |
| Example 19 | | 5 | 0.44 | 95 |
| Example 20 | | 10 | 0.48 | 96 |
| Example 21 | Component (I-d) | 0.5 | 0.41 | 95 |
| Comparative Example 11 | — | — | 0.58 | 93 |
| Comparative Example 12 | $CF_3CF_2CF_2CF_2CF_2CN$ | 0.5 | 0.56 | 94 |
| Comparative Example 13 | $CF_3CF_2CF_2OCF(CF_3)CN$ | 0.5 | 0.56 | 94 |

TABLE 4

| | Compound mixed to base electrolytic solution | | | Storage |
|---|---|---|---|---|
| | Structure | Mixing proportion (mass %) | Amount of gas (mL) | capacity retention ratio (%) |
| Example 22 | Component (I-b) | 0.001 | 0.16 | 89 |
| Example 23 | | 0.01 | 0.13 | 90 |
| Example 24 | | 0.1 | 0.08 | 91 |
| Example 25 | | 0.5 | 0.06 | 92 |
| Example 26 | | 6 | 0.10 | 92 |
| Example 27 | | 8 | 0.12 | 92 |
| Example 28 | | 20 | 0.17 | 89 |
| Example 29 | Component (I-c) | 0.5 | 0.08 | 92 |
| Example 30 | Component (I-e) | 0.5 | 0.10 | 91 |
| Comparative Example 14 | — | — | 0.20 | 86 |
| Comparative Example 15 | Component (I-b) | 30 | 0.19 | 87 |
| Comparative Example 16 | Component (I-b) | 50 | (*) — | (*) — |
| Comparative Example 17 | $CF_3CF_2CF_2CF_2CF_2CN$ | 0.5 | 0.18 | 87 |
| Comparative Example 18 | $CF_3CF_2CF_2OCF(CF_3)CN$ | 0.5 | 0.18 | 87 |

(*) Part of 50% by mass of the component (I-b) was phase-separated from the base electrolytic solution, which prevented the evaluation of battery characteristics.

TABLE 5

| | Compound mixed to base electrolytic solution | | | Storage |
|---|---|---|---|---|
| | Structure | Mixing proportion (mass %) | Amount of gas (mL) | capacity retention ratio (%) |
| Example 31 | Component (I-b) | 0.001 | 0.49 | 90 |
| Example 32 | | 0.01 | 0.45 | 91 |
| Example 33 | | 0.1 | 0.39 | 92 |
| Example 34 | | 0.5 | 0.37 | 93 |
| Example 35 | | 6 | 0.40 | 93 |
| Example 36 | | 8 | 0.43 | 93 |
| Example 37 | | 20 | 0.46 | 90 |
| Example 38 | Component (I-c) | 0.5 | 0.40 | 93 |
| Example 39 | Component (I-e) | 0.5 | 0.39 | 92 |
| Comparative Example 19 | — | — | 0.57 | 87 |
| Comparative Example 20 | Component (I-b) | 30 | 0.52 | 88 |
| Comparative Example 21 | Component (I-b) | 50 | (*) — | (*) — |
| Comparative Example 22 | $CF_3CF_2CF_2CF_2CF_2CN$ | 0.5 | 0.52 | 88 |
| Comparative Example 23 | $CF_3CF_2CF_2OCF(CF_3)CN$ | 0.5 | 0.53 | 89 |

(*) Part of 50% by mass of the component (I-b) was phase-separated from the base electrolytic solution, which prevented the evaluation of battery characteristics.

TABLE 6

| | Compound mixed to base electrolytic solution | | | Storage |
|---|---|---|---|---|
| | Structure | Mixing proportion (mass %) | Amount of gas (mL) | capacity retention ratio (%) |
| Example 40 | Component (I-b) | 0.1 | 0.41 | 92 |
| Example 41 | | 0.5 | 0.39 | 94 |
| Example 42 | | 5 | 0.44 | 95 |
| Example 43 | | 10 | 0.48 | 96 |
| Example 44 | Component (I-c) | 0.5 | 0.42 | 94 |
| Example 45 | Component (I-e) | 0.5 | 0.43 | 94 |
| Comparative Example 24 | — | — | 0.58 | 88 |
| Comparative Example 25 | $CF_3CF_2CF_2CF_2CF_2CN$ | 0.5 | 0.56 | 90 |
| Comparative Example 26 | $CF_3CF_2CF_2OCF(CF_3)CN$ | 0.5 | 0.56 | 90 |

INDUSTRIAL APPLICABILITY

The electrolytic solution of the present invention can favorably be used for electrochemical devices such as lithium ion secondary batteries.

The invention claimed is:

1. An electrolytic solution for an electrochemical device or a secondary battery comprising
    nonaqueous solvent (I),
    a lithium salt, and
    0.001 to 20% by mass of a compound represented by the following formula (1) or a compound represented by the following formula (A), $$R^1-ORf^1-(ORf^2)_l-(ORf^3)_m-CN \tag{1}$$

wherein $R^1$ represents $CH_3-Rf-$, $CH_2F-Rf-$, or $CHF_2-Rf-$, and Rf in $R^1$ represents an alkylene group which may optionally have a fluorine atom,
    $Rf^1$, $Rf^2$, and $Rf^3$ may be the same as or different from each other, and individually represent a C1-C3 fluorinated alkylene group, and
    l and m may be the same as or different from each other, and individually represent an integer of 0 to 5, $$R^{41}-ORf^{41}-(ORf^{42})_l-(ORf^{43})_m-CN \tag{A}$$

wherein $R^{41}$ represents a C2-C9 group having an unsaturated bond,
    $Rf^{41}$, $Rf^{42}$, and $Rf^{43}$ may be the same as or different from each other, and individually represent a C1-C3 alkylene group which may optionally have a fluorine atom, and l and m may be the same as or different from each other, and individually represent an integer of 0 to 5.

2. The electrolytic solution according to claim 1, wherein the compound represented by the formula (1) and the compound represented by the formula (A) each have a molecular weight of 100 to 650.

3. The electrolytic solution according to claim 1, wherein the nonaqueous solvent (I) comprises a cyclic carbonate.

4. The electrolytic solution according to claim 1, wherein the nonaqueous solvent (I) comprises a linear carbonate.

5. An electrochemical device comprising the electrolytic solution according to claim 1.

6. A lithium ion secondary battery comprising the electrolytic solution according to claim 1.

7. A module comprising the lithium ion secondary battery according to claim 6.

\* \* \* \* \*